United States Patent [19]
Kikuchi et al.

[11] Patent Number: 5,448,400
[45] Date of Patent: Sep. 5, 1995

[54] ZOOM FINDER OF REAL IMAGE TYPE AND REAL IMAGE TYPE ZOOM FINDER CAPABLE OF MAKING MAGNIFICATION TRANSITION

[75] Inventors: Syuichi Kikuchi; Takao Yamaguchi, both of Yokohama; Noriyuki Iwata, Fujisawa; Masami Itoh, Higashi-Kurume, all of Japan

[73] Assignee: Ricoh Company, Ltd., Tokyo, Japan

[21] Appl. No.: 44,628

[22] Filed: Apr. 9, 1993

[30] Foreign Application Priority Data

Apr. 10, 1992 [JP] Japan ................................. 4-090702
Sep. 25, 1992 [JP] Japan ................................. 4-256874

[51] Int. Cl.⁶ ........................................... G02B 15/14
[52] U.S. Cl. ................................. 359/422; 359/774; 359/687; 359/676; 359/643; 359/686; 359/432
[58] Field of Search ............... 359/676, 636, 660, 686, 359/687, 422, 432, 760, 756, 750, 681, 682

[56] References Cited

U.S. PATENT DOCUMENTS

| | | | |
|---|---|---|---|
| 5,144,480 | 9/1992 | Oshita | 359/422 |
| 5,184,252 | 2/1993 | Miyauchi et al. | 359/774 X |
| 5,193,030 | 3/1993 | Nozaki et al. | 359/687 |
| 5,233,471 | 8/1993 | Nakamura et al. | 359/687 |

FOREIGN PATENT DOCUMENTS 2-173713  7/1990  Japan .
2-173714  7/1990  Japan .
2-191908  7/1990  Japan .

*Primary Examiner*—Viet Q. Nguyen
*Attorney, Agent, or Firm*—Oblon, Spivak, McClelland, Maier & Neustadt

[57] ABSTRACT

A zoom finder of a real image type has an objective lens having positive refracting power and an eyepiece having positive refracting power. The objective lens is constructed by first, second, third and fourth lens groups sequentially arranged from an object side. The first lens group has positive refracting power. The second lens group has negative refracting power. The third lens group has positive refracting power. The fourth lens group has positive refracting power. The zoom finder is constructed such that a real image is focused and formed by the objective lens between the fourth lens group and the eyepiece and is observed through the eyepiece. A magnification of the zoom finder is increased by moving the second lens group from the object side to an eyepiece side. A change in diopter caused by this increase in magnification is corrected by moving the fourth lens group. In accordance with the above structure, an entire length of the zoom finder is short and is not changed in a zooming operation. Further, the structure of a mechanical mechanism for displacing lenses in the zooming operation is simplified and no diopter of the zoom finder is changed in the zooming operation.

24 Claims, 18 Drawing Sheets

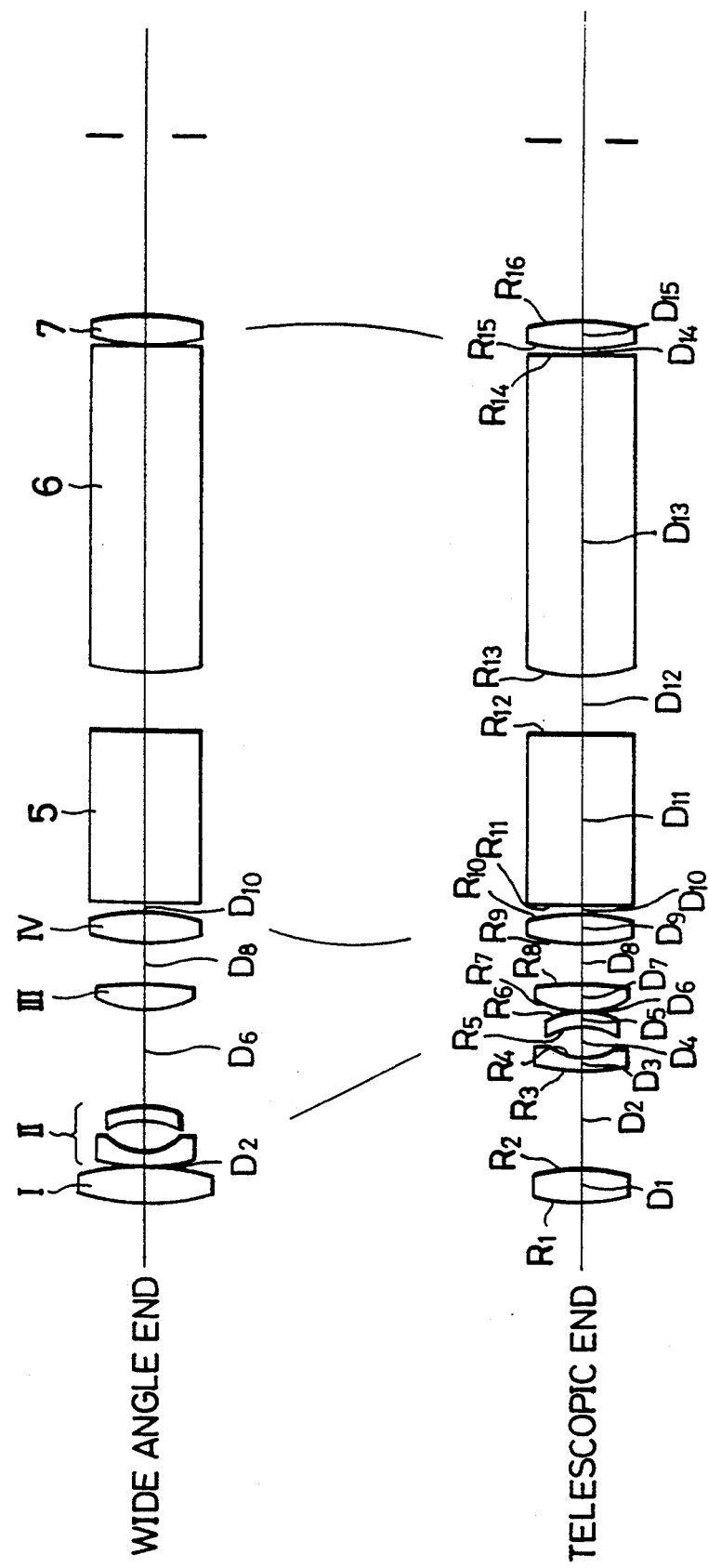

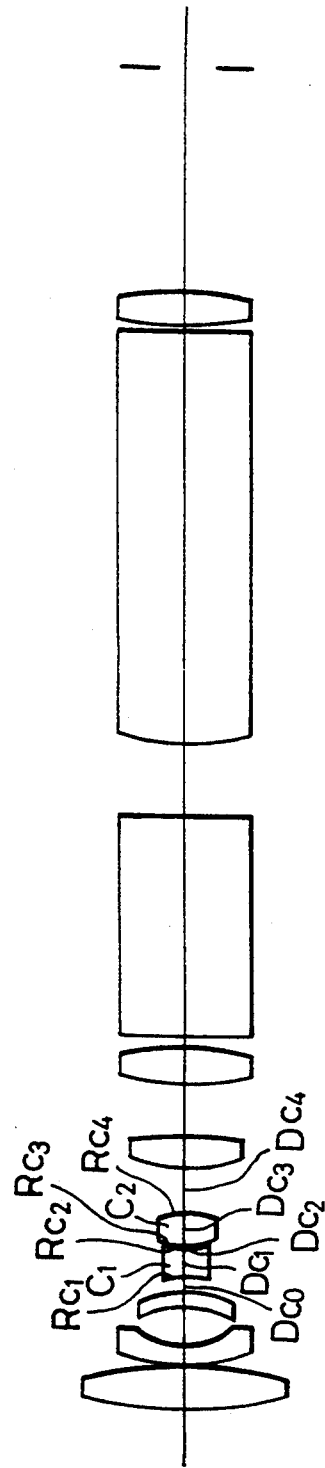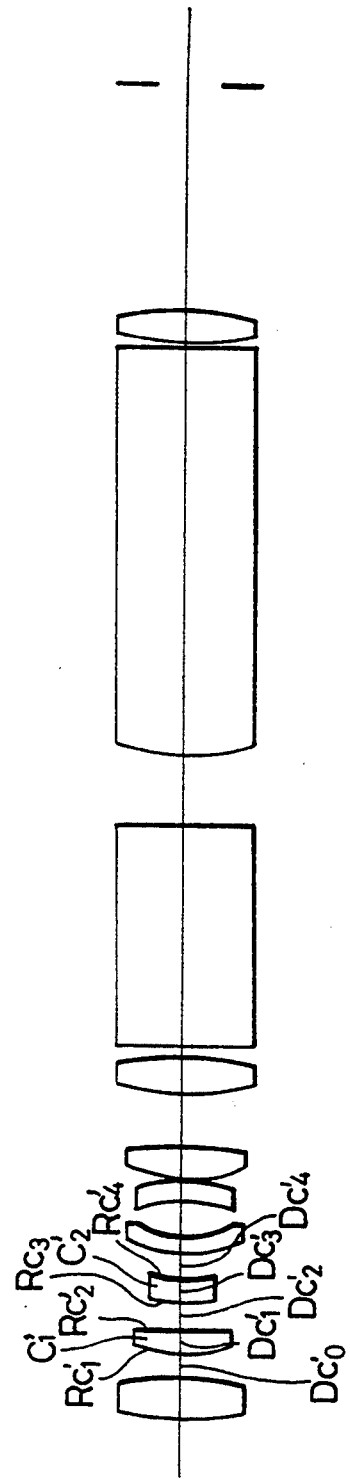

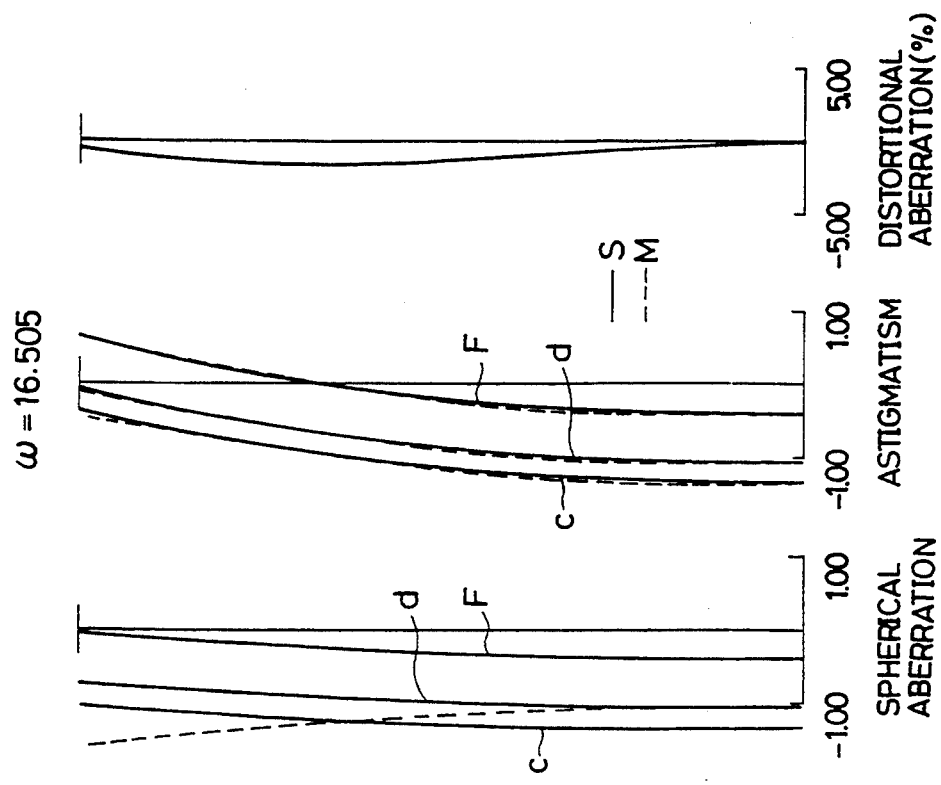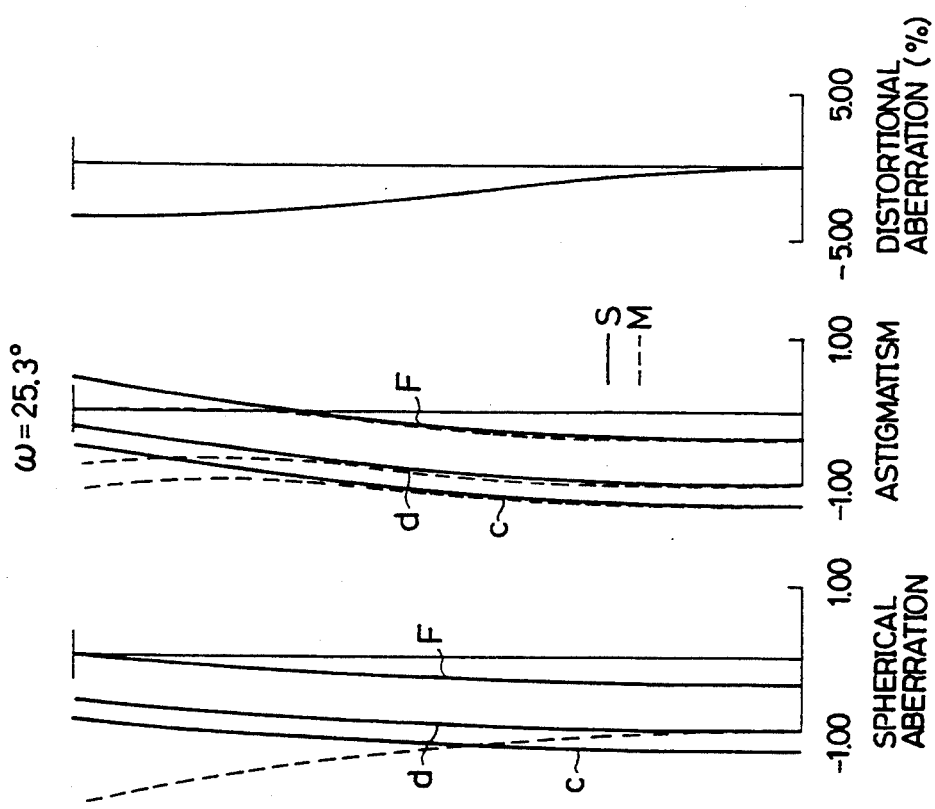

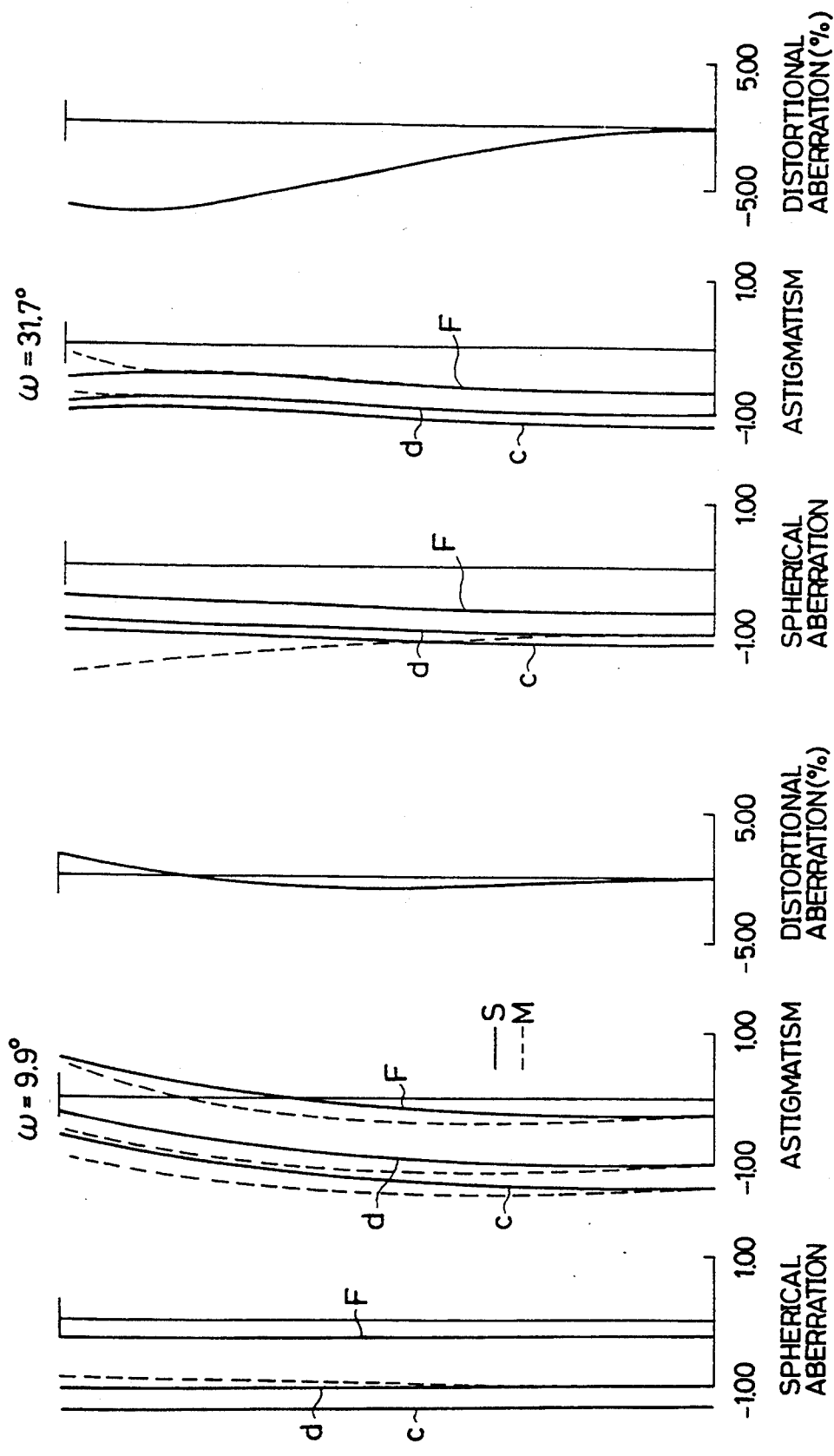

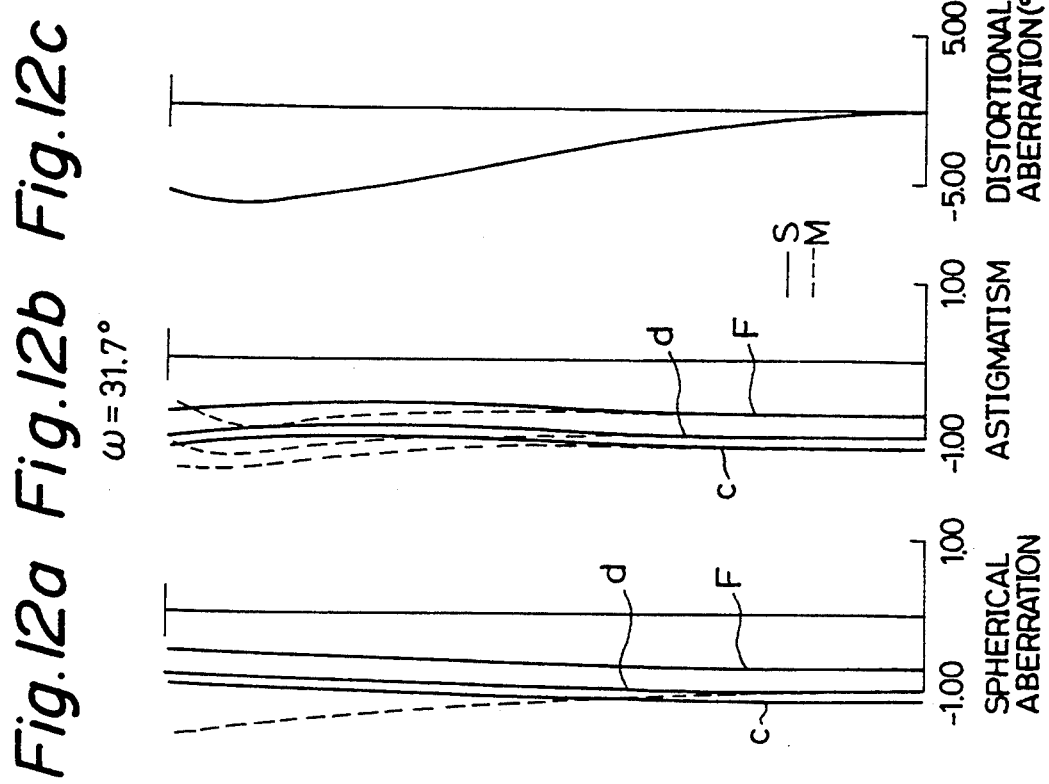
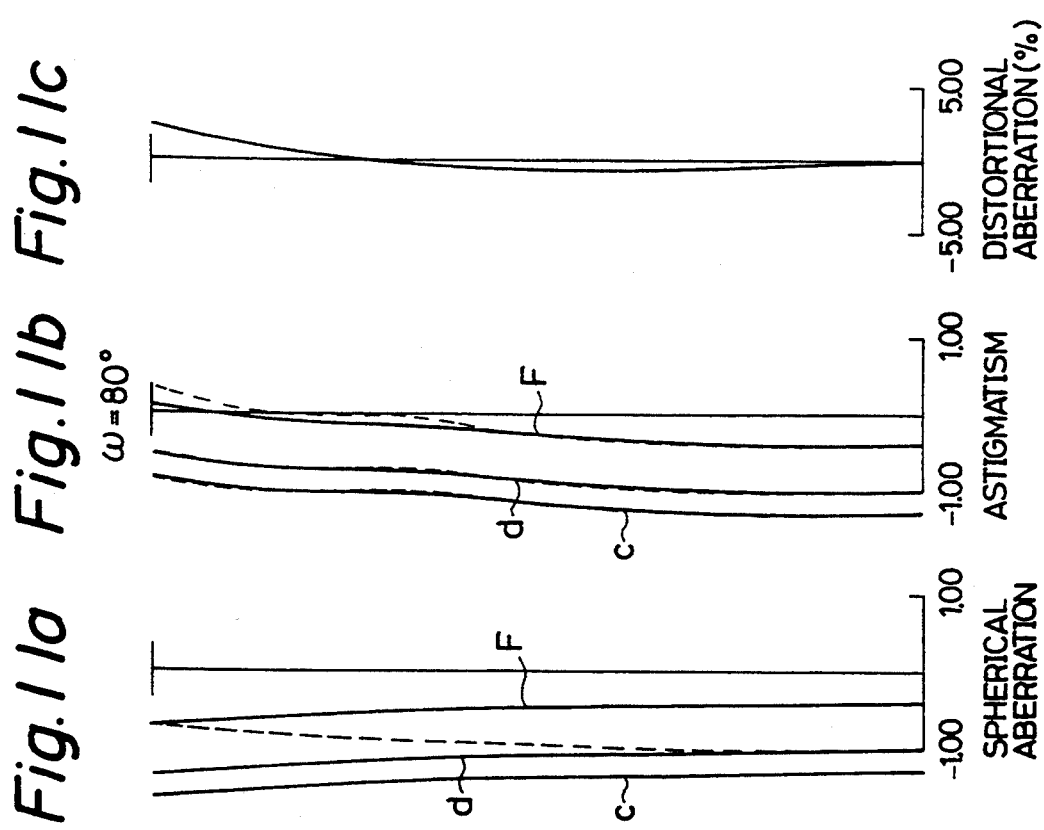

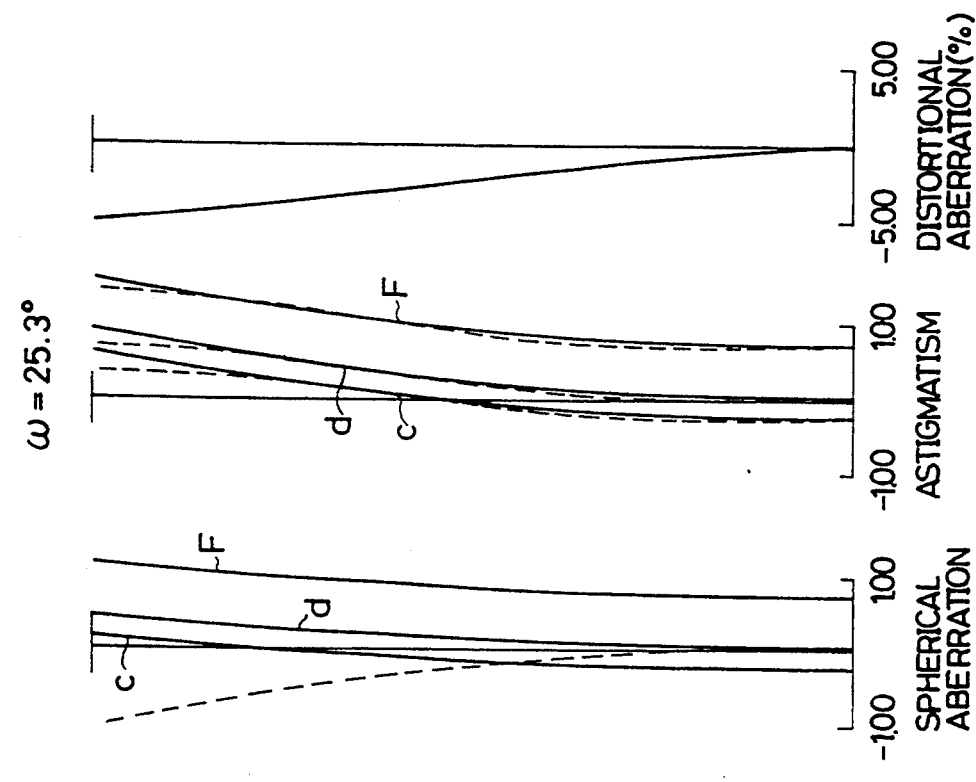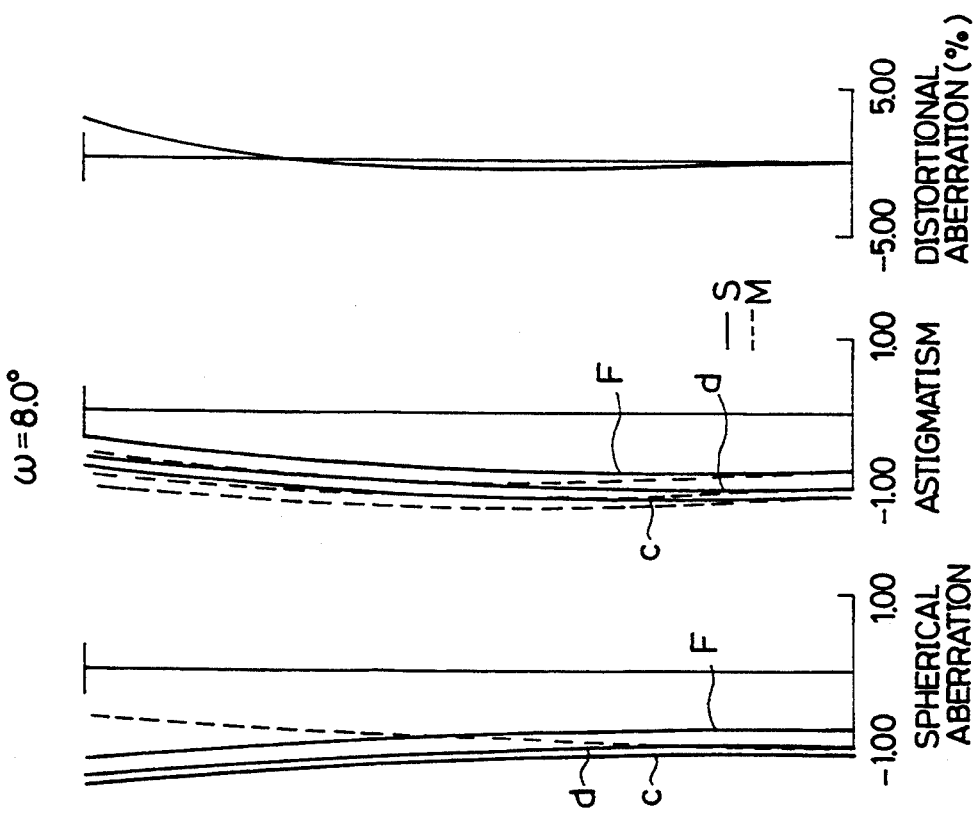

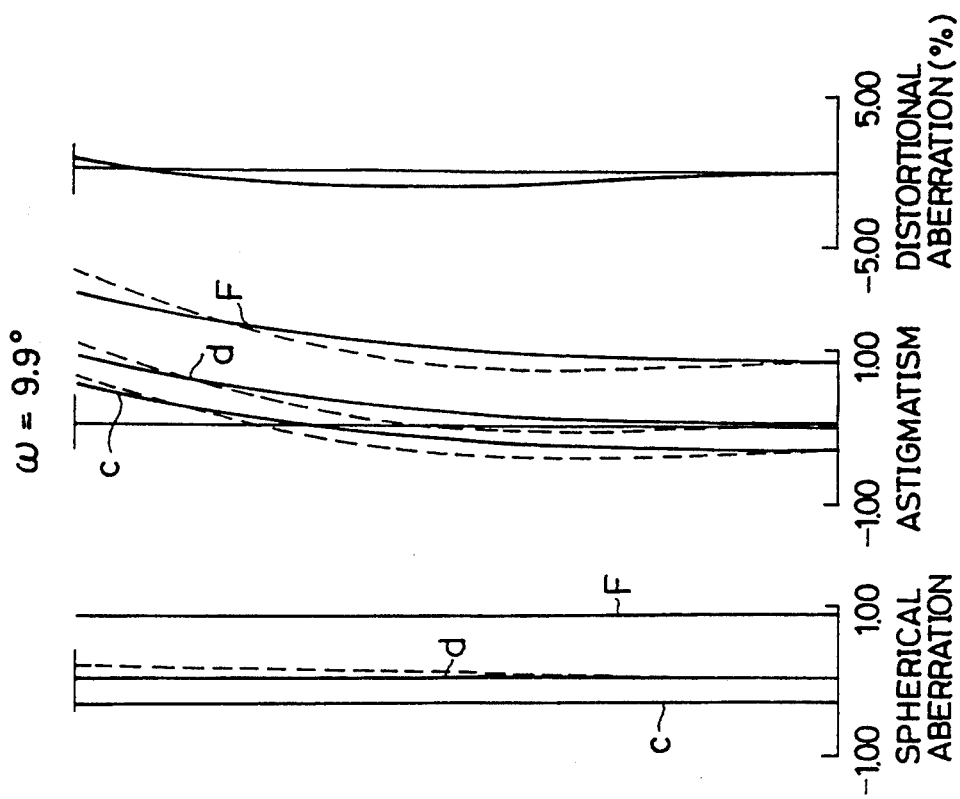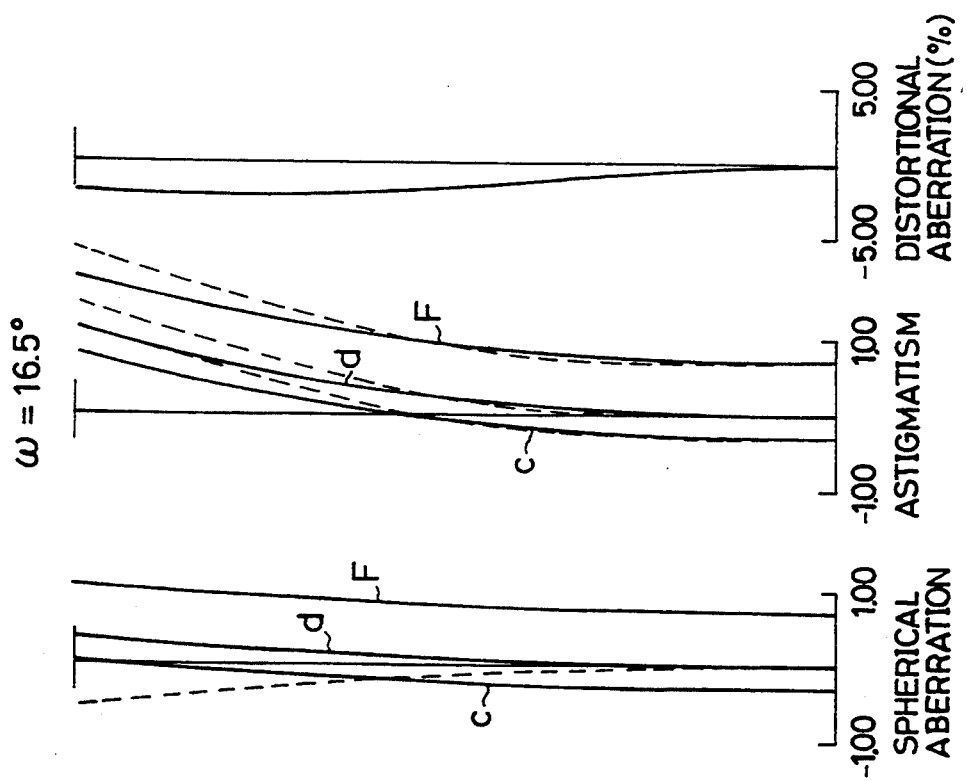

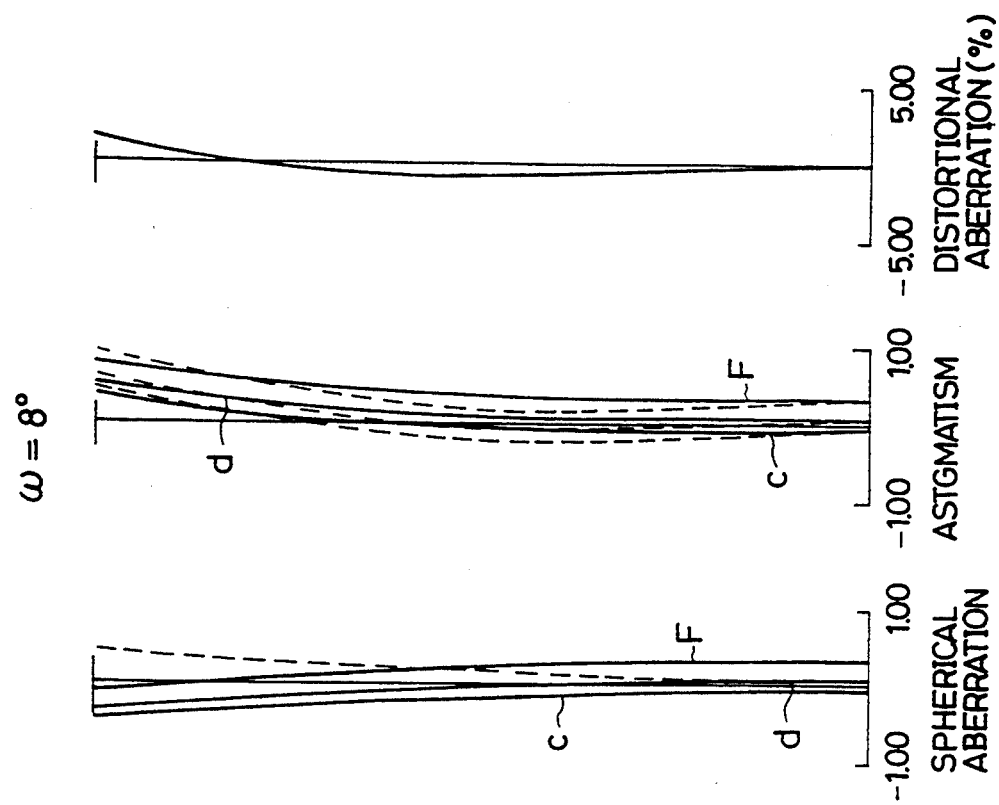
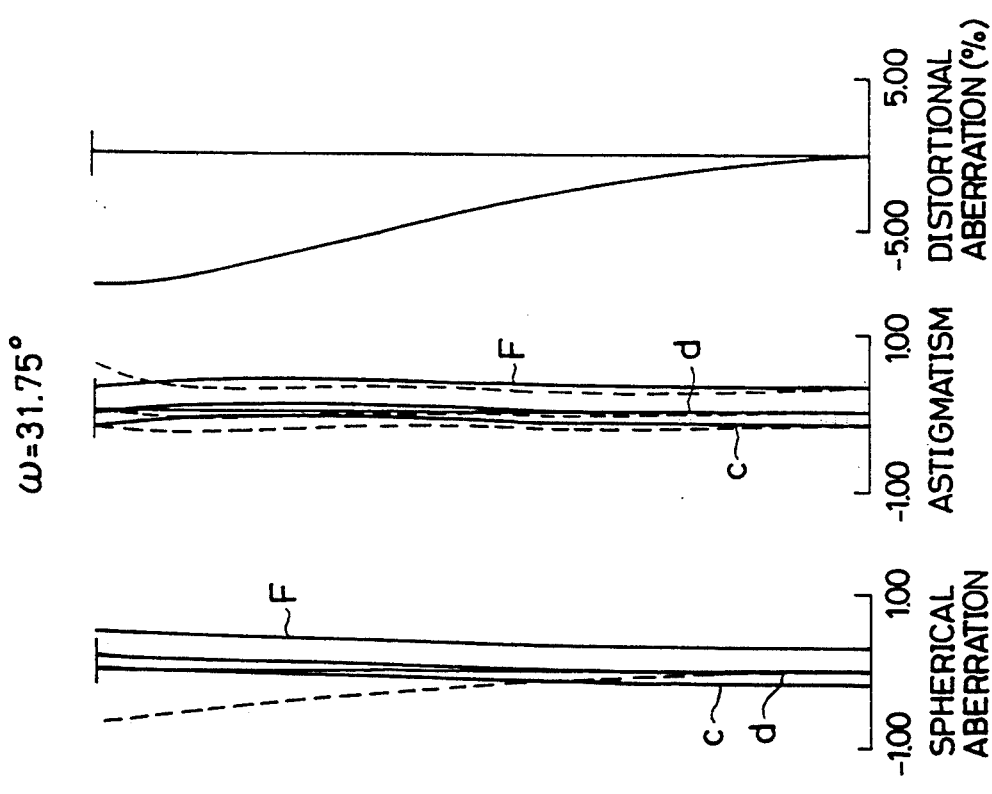

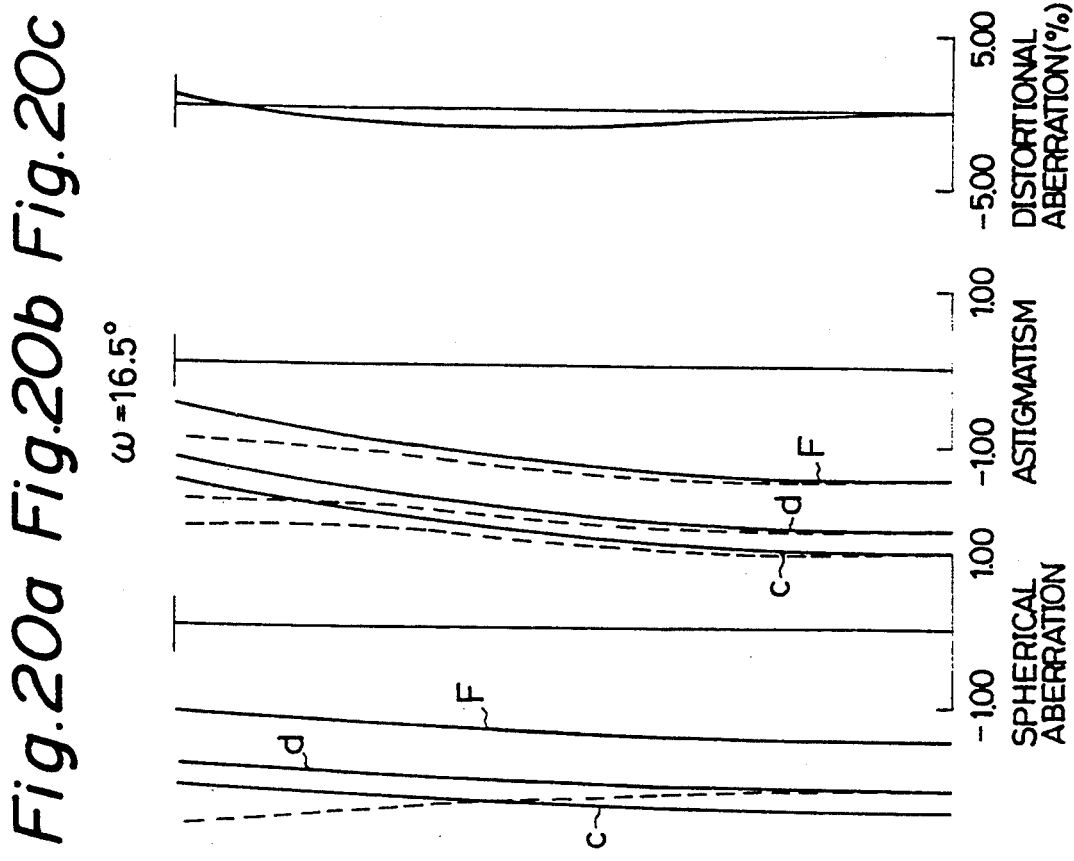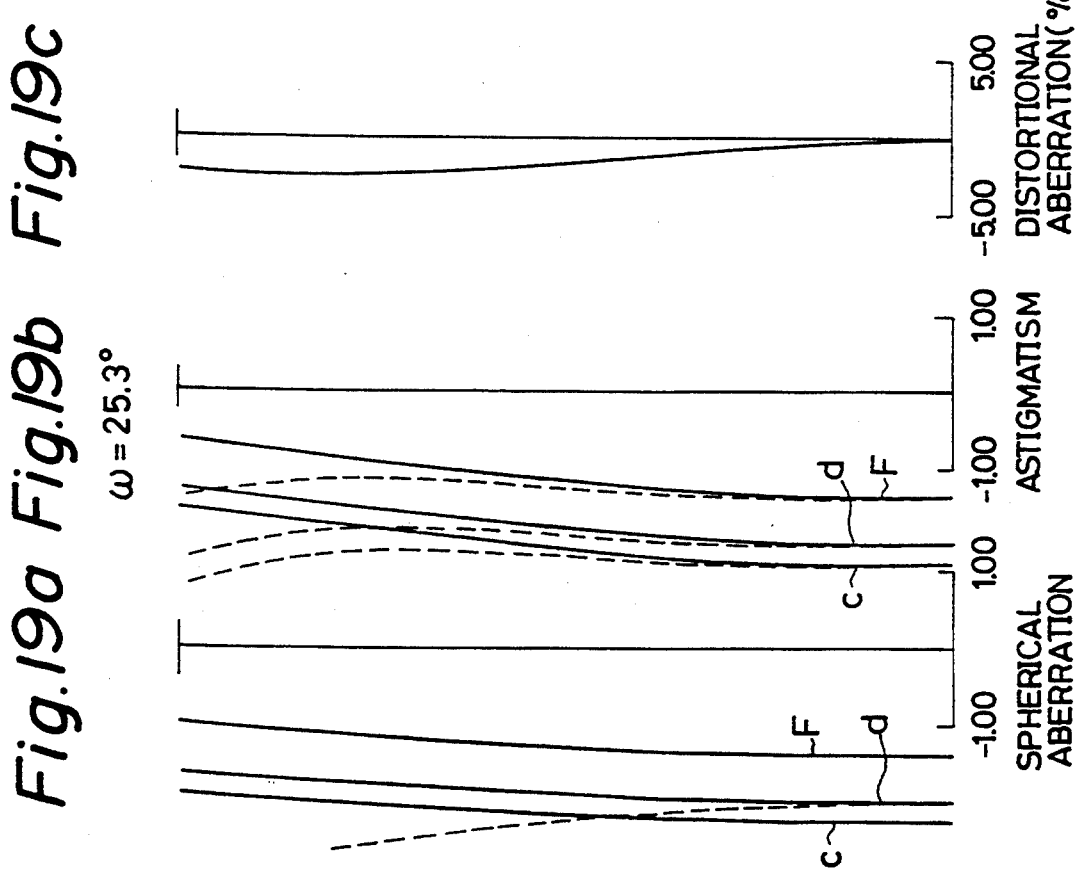

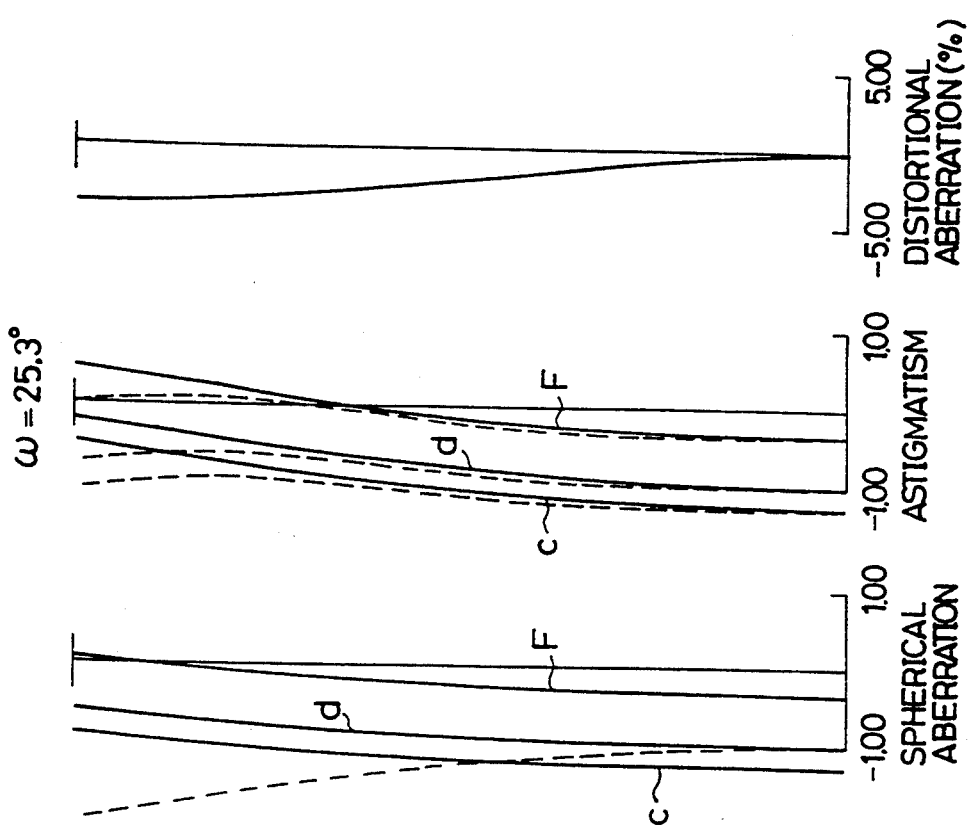
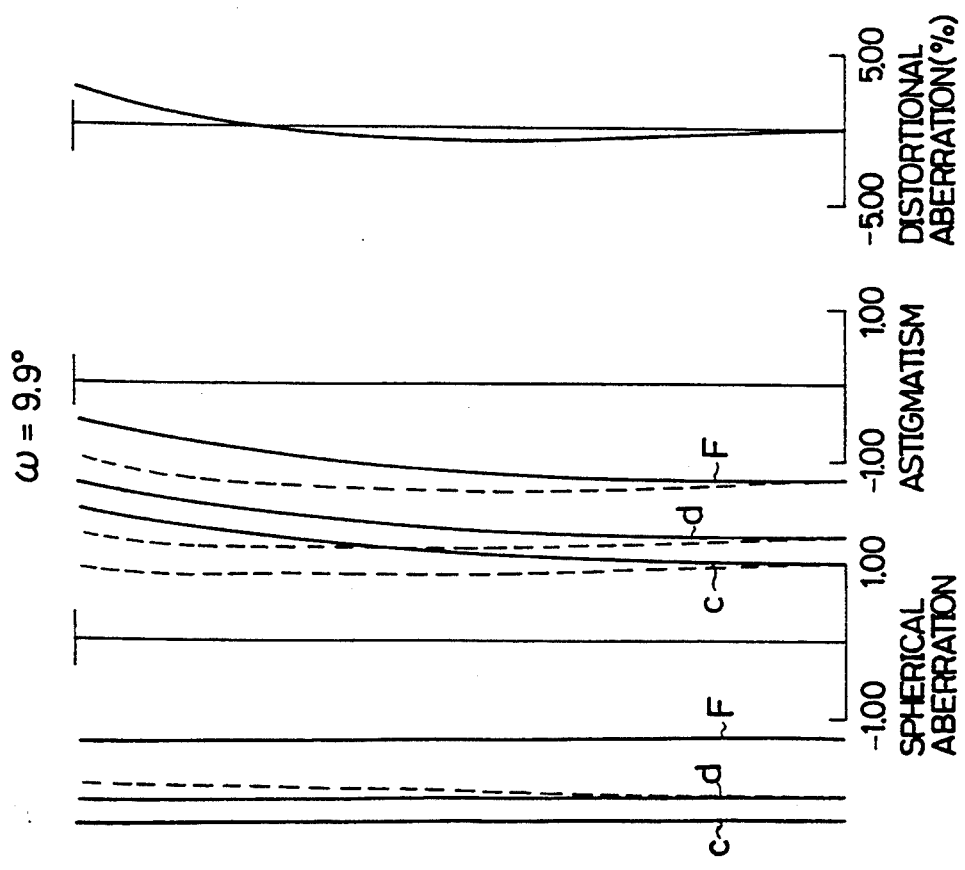

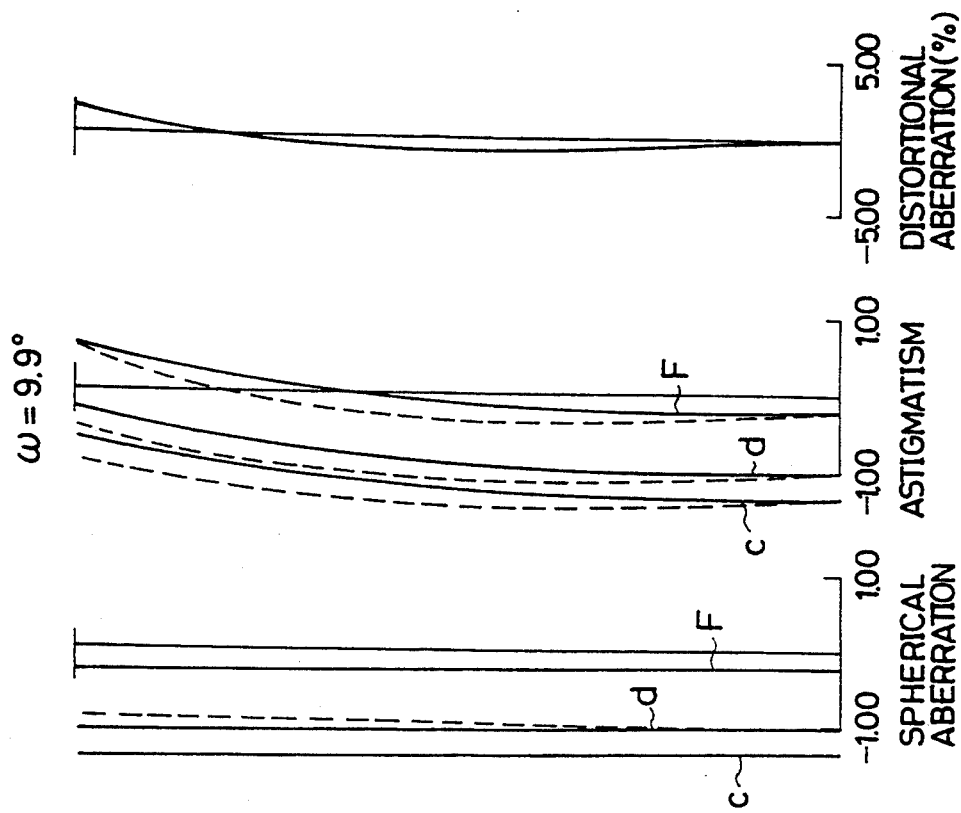
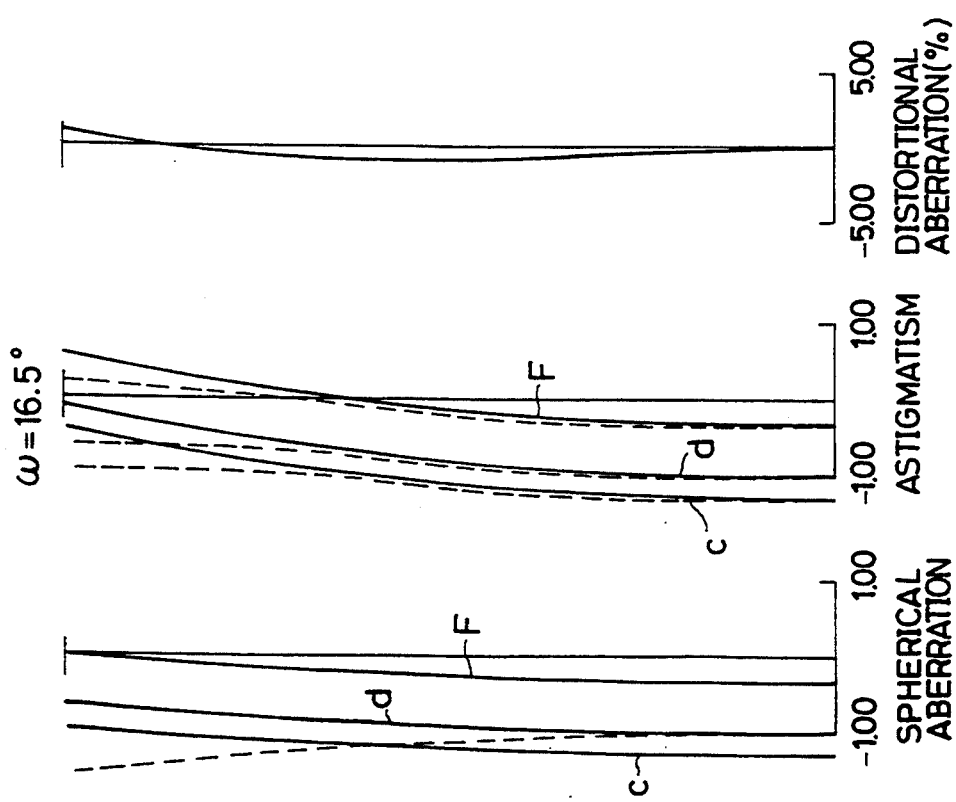

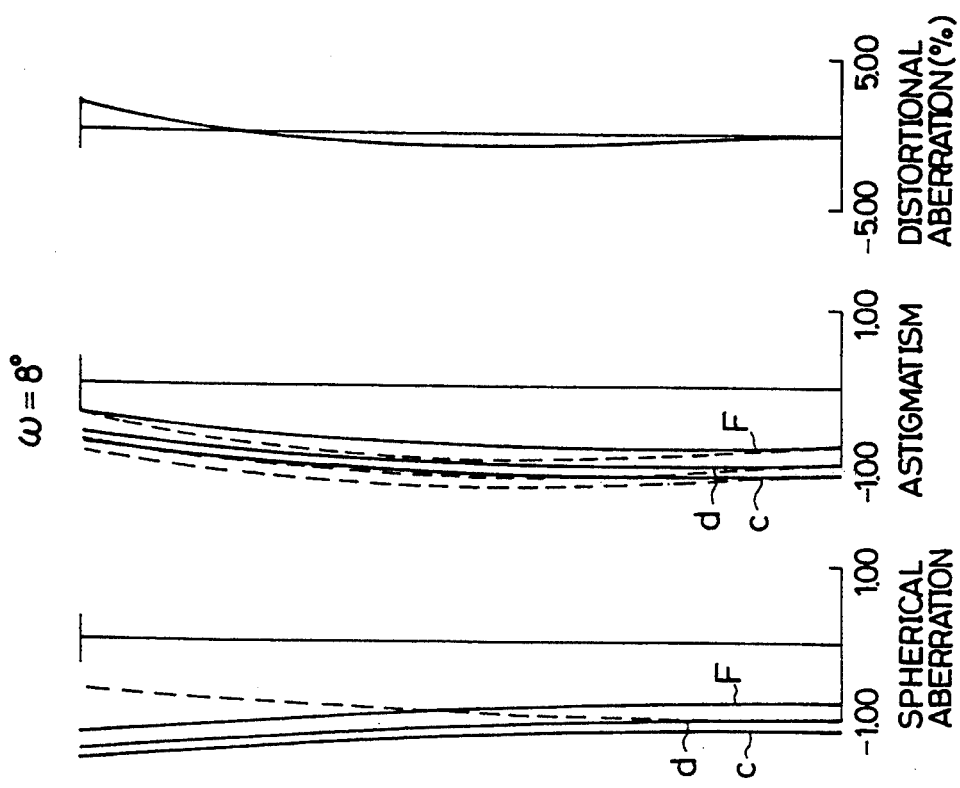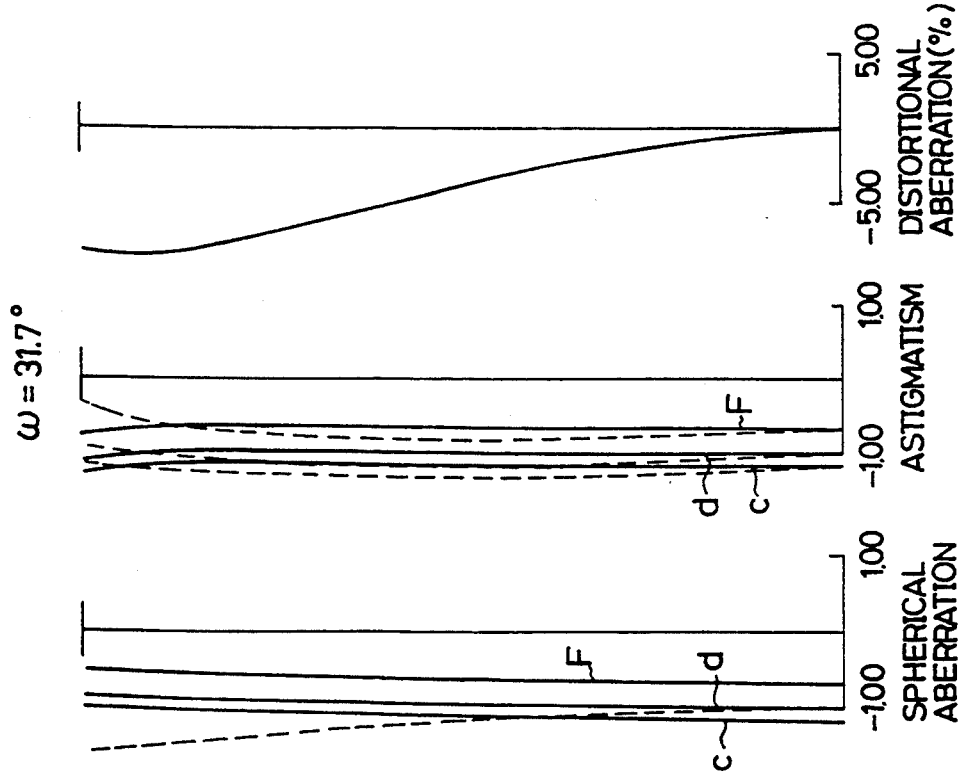

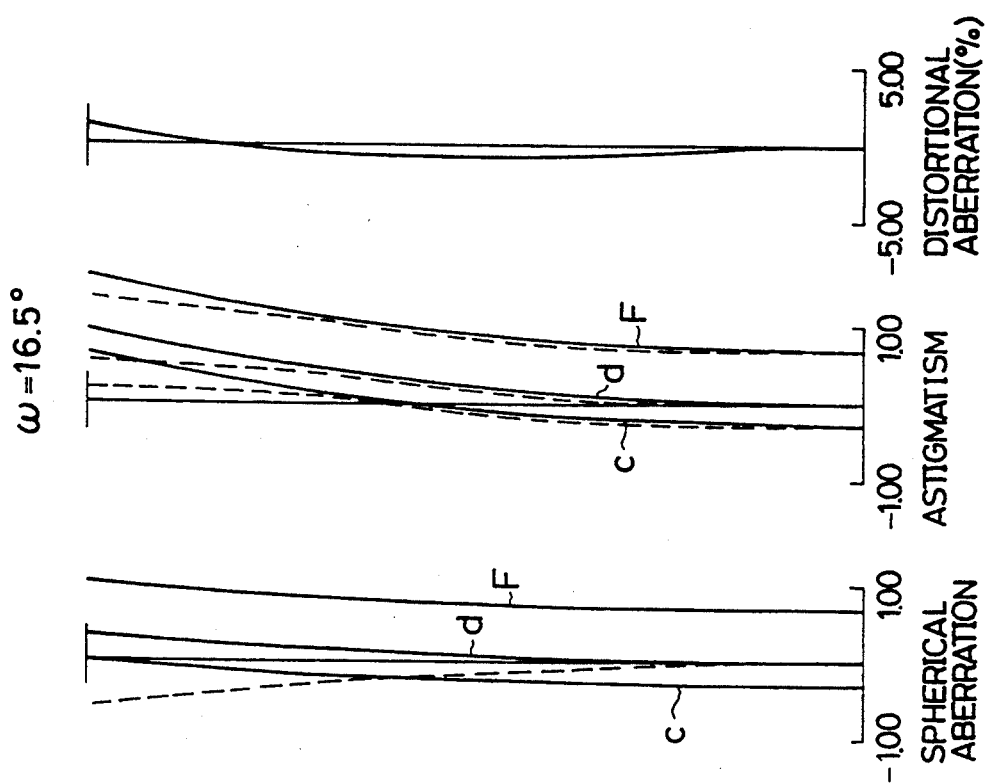
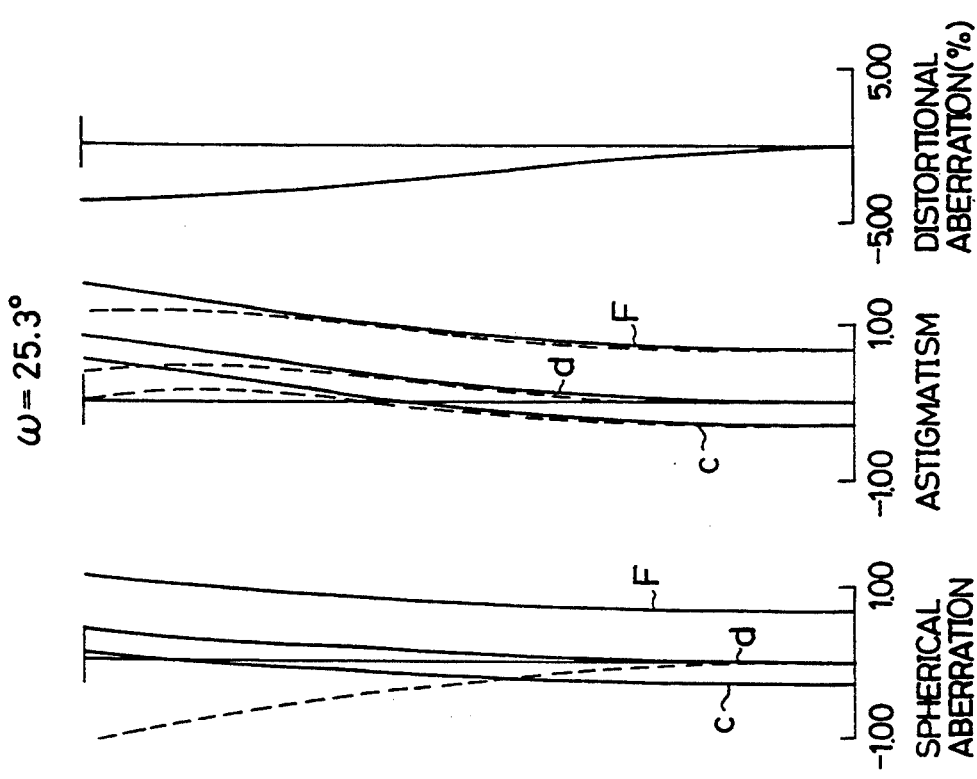

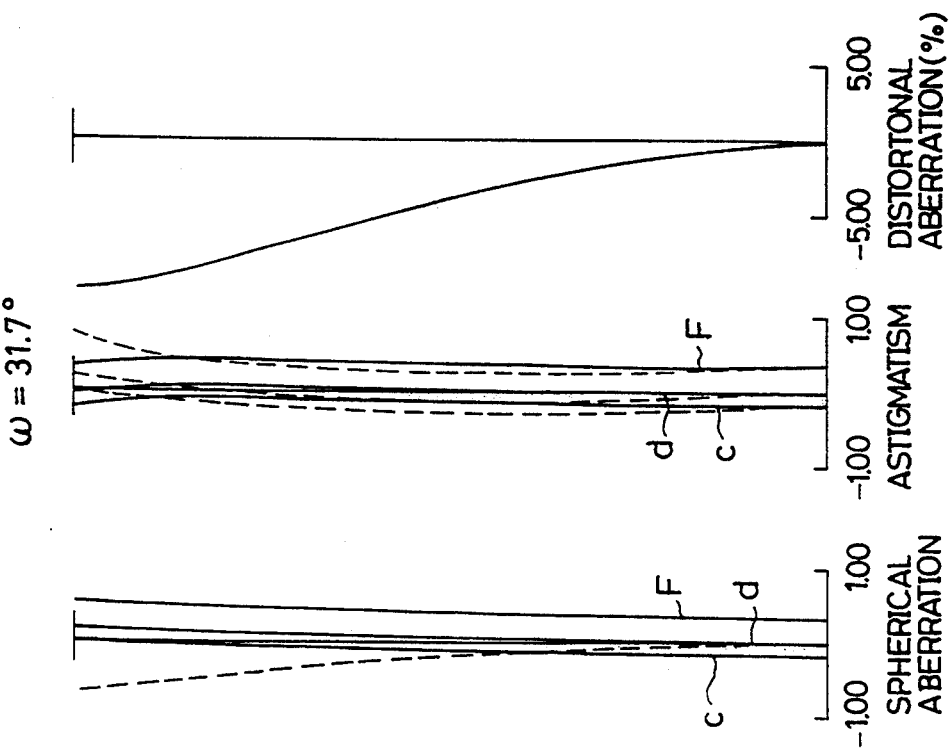
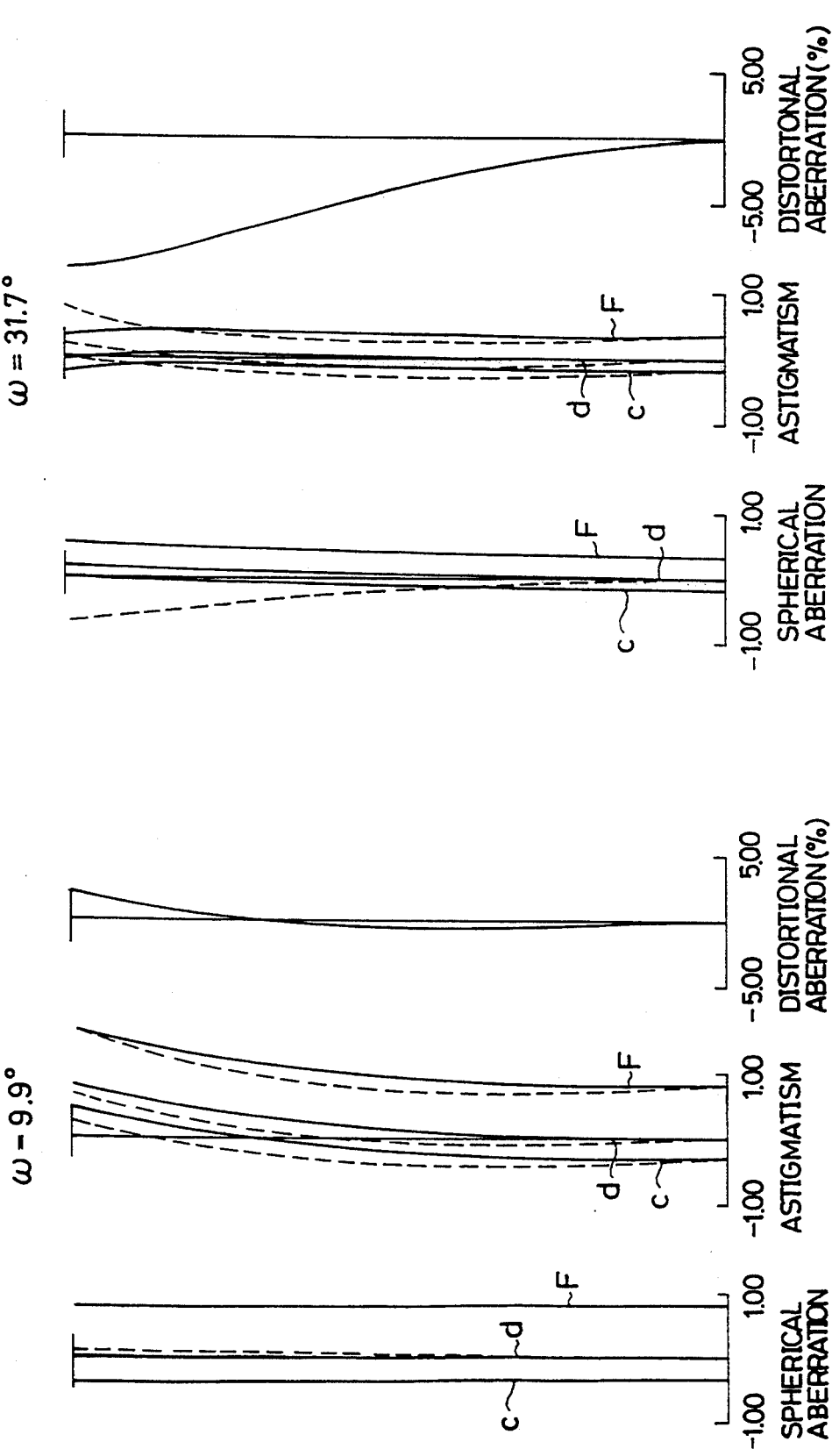

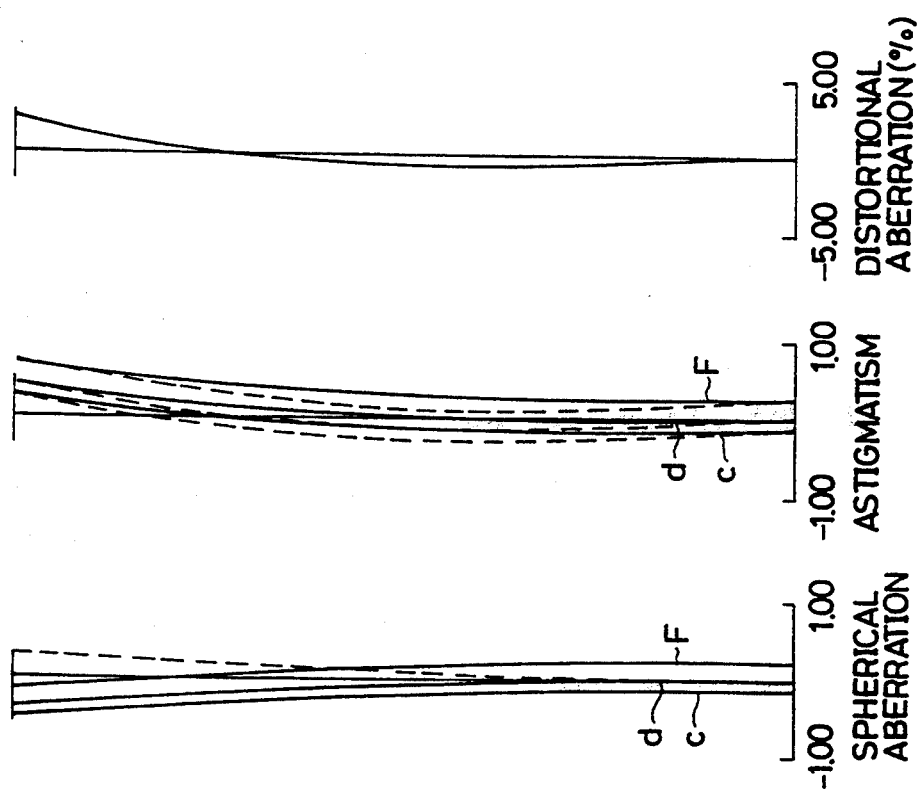

ZOOM FINDER OF REAL IMAGE TYPE AND REAL IMAGE TYPE ZOOM FINDER CAPABLE OF MAKING MAGNIFICATION TRANSITION

BACKGROUND OF THE INVENTION

1. Field of the Invention

The present invention relates to a zoom finder of a real image type and a real image type zoom finder capable of making a magnification transition. The present invention can be utilized in a finder for a 35 mm lens shutter camera, a video camera and an electronic still camera.

2. Description of the Related Art

In a desirable zoom finder of a real image type, an entire length of the zoom finder is short and the structure of a mechanical mechanism for displacing lenses in a zooming operation is simplified and no diopter is changed in the zooming operation.

The following Japanese Patent Applications show general zoom finders of a real image type in which the entire length of the zoom finder is short and is not changed in the zooming operation. In Japanese Patent Application Laying Open (KOKAI) No. 2-191908, an objective lens is constructed by a first lens group having positive refracting power, a second lens group having negative refracting power and a third lens group having positive refracting power. A magnification of this zoom finder is increased by displacing the second lens group from an object side to an eyepiece side. In Japanese Patent Application Laying Open (KOKAI) No. 2-173713, an objective lens is constructed by a first lens group having positive refracting power, a second lens group having negative refracting power, a third lens group having positive refracting power and a fourth lens group having small refracting power. A zooming operation of this zoom finder is performed by moving the second and third lens groups while a diopter of the zoom finder is constantly held. In Japanese Patent Application Laying Open (KOKAI) No. 2-173714, an objective lens is constructed by a first lens group having positive refracting power, a second lens group having negative refracting power and a third lens group having positive refracting power. A zooming operation of this zoom finder is performed by moving the second and third lens groups while a diopter of the zoom finder is constantly held. In the first zoom finder of the Japanese Patent Application Laying Open (KOKAI) No. 2-191908, the diopter of the zoom finder is changed in the zooming operation. In the Japanese Patent Application Laying Open (KOKAI) Nos. 2-173718 and 173714, a moving amount of the third lens group is increased to perform the zooming operation so that it is necessary to dispose a space for moving the third lens group and a mechanism for moving the third lens group.

SUMMARY OF THE INVENTION

It is therefore an object of the present invention to provide a zoom finder of a real image type in which an entire length of the zoom finder is short and is not changed in a zooming operation and the structure of a mechanical mechanism for displacing lenses in the zooming operation is simplified and no diopter of the zoom finder is changed in the zooming operation.

Another object of the present invention is to provide a zoom finder of a real image type in which an entire length of the zoom finder is short and is changed in a zooming operation, but the structure of a mechanical mechanism for displacing lenses in the zooming operation is further simplified and no diopter of the zoom finder is changed in the zooming operation.

Another object of the present invention is to provide a zoom finder of a real image type capable of making a magnification transition in which magnifications can be changed or transited in a region exceeding a zooming region of each of the above zoom finders of a real image type.

The above objects of the present invention can be achieved by a zoom finder of a real image type comprising an objective lens having positive refracting power; and an eyepiece having positive refracting power; the objective lens being constructed by first, second, third and fourth lens groups sequentially arranged from an object side; the first lens group having positive refracting power; the second lens group having negative refracting power; the third lens group having positive refracting power; and the fourth lens group having positive refracting power; the zoom finder being constructed such that a real image is focused and formed by the objective lens between the fourth lens group and the eyepiece and is observed through the eyepiece; and a magnification of the zoom finder is increased by moving the second lens group from the object side to an eyepiece side, and a change in diopter caused by this increase in magnification is corrected by moving the fourth lens group.

The above objects of the present invention can be also achieved by a zoom finder of a real image type comprising an objective lens having positive refracting power; and an eyepiece having positive refracting power; the objective lens being constructed by first, second, third and fourth lens groups sequentially arranged from an object side; the first lens group having positive refracting power; the second lens group having negative refracting power; the third lens group having positive refracting power; and the fourth lens group having positive refracting power; the zoom finder being constructed such that a real image is focused and formed by the objective lens between the fourth lens group and the eyepiece and is observed through the eyepiece; and a magnification of the zoom finder is increased by moving the second lens group from the object side to an eyepiece side, and a change in diopter caused by this increase in magnification is corrected by moving the eyepiece.

In accordance with the above structures, an entire length of the zoom finder is short and is not changed in a zooming operation and the structure of a mechanical mechanism for displacing lenses in the zooming operation is simplified and no diopter of the zoom finder is changed in the zooming operation.

Further, in accordance with the above structures, an entire length of the zoom finder is short and is changed in a zooming operation, but the structure of a mechanical mechanism for displacing lenses in the zooming operation is further simplified and no diopter of the zoom finder is changed in the zooming operation.

Further, in accordance with the above structures, magnifications can be changed or transited in a region exceeding a zooming region of each of the above zoom finders of a real image type.

Further objects and advantages of the present invention will be apparent from the following description of the preferred embodiments of the present invention as illustrated in the accompanying drawings.

BRIEF DESCRIPTION OF THE DRAWINGS

FIG. 4 is a view showing lens constructions of the real image-type zoom finder at the wide angle and telescopic ends thereof in Embodiment 1 of the present invention;

FIG. 5 is a view showing a state in which the converter lens for a low magnification transition is inserted into the real image type zoom finder at the wide angle end thereof in the Embodiment 1;

FIG. 6 is a view showing a state in which the converter lens for a high magnification transition is inserted into the real image type zoom finder at the telescopic end thereof in the Embodiment 1;

FIGS. 7a, 7b and 7c are diagrams respectively showing spherical aberration, astigmatism and distortional aberration in a wide angle state of the zoom finder in the Embodiment 1;

FIGS. 8a, 8b and 8c are diagrams respectively showing spherical aberration, astigmatism and distortional aberration in a mean state of the zoom finder in the Embodiment 1;

FIGS. 9a, 9b and 9c are diagrams respectively showing spherical aberration, astigmatism and distortion aberration in a telescopic state of the zoom finder in the Embodiment 1;

FIGS. 10a, 10b and 10c are diagrams respectively showing spherical aberration, astigmatism and distortional aberration in an S-wide angle state of the zoom finder in Embodiment 2;

FIGS. 11a, 11b and 11c are diagrams respectively showing spherical aberration, astigmatism and distortional aberration in an S-telescopic state of the zoom finder in Embodiment 3;

FIGS. 12a, 12b and 12c are diagrams respectively showing spherical aberration, astigmatism and distortional aberration in an S-wide angle state of the zoom finder in Embodiment 4;

FIGS. 13a, 13b and 13c are diagrams respectively showing spherical aberration, astigmatism and distortional aberration in an S-telescopic state of the zoom finder in Embodiment 5;

FIGS. 14a, 14b and 14c are diagrams respectively showing spherical aberration, astigmatism and distortional aberration in a wide angle state of the zoom finder in Embodiment 6;

FIGS. 15a, 15b and 15c are diagrams respectively showing spherical aberration, astigmatism and distortional aberration in a mean state of the zoom finder in the Embodiment 6;

FIGS. 16a, 16b and 16c are diagrams respectively showing spherical aberration, astigmatism and distortional aberration in a telescopic state of the zoom finder in the Embodiment 6;

FIGS. 17a, 17b and 17c are diagrams respectively showing spherical aberration, astigmatism and distortional aberration in an S-wide angle state of the zoom finder in the Embodiment 6;

FIGS. 18a, 18b and 18c are diagrams respectively showing spherical aberration, astigmatism and distortional aberration in an S-telescopic state of the zoom finder in the Embodiment 6;

FIGS. 18a, 18b and 18c are diagrams respectively showing spherical aberration, astigmatism and distortional aberration in a wide angle state of the zoom finder in Embodiment 7;

FIGS. 20a, 20b and 20c are diagrams respectively showing spherical aberration, astigmatism and distortional aberration in a mean state of the zoom finder in the Embodiment 7;

FIGS. 21a, 21b and 21c are diagrams respectively showing spherical aberration, astigmatism and distortional aberration in a telescopic state of the zoom finder in the Embodiment 7;

FIGS. 22a, 22b and 22c are diagrams respectively showing spherical aberration, astigmatism and distortional aberration in a wide angle state of the zoom finder in Embodiment 8;

FIGS. 28a, 28b and 28c are diagrams respectively showing spherical aberration, astigmatism and distortional aberration in a mean state of the zoom finder in the Embodiment 8;

FIGS. 24a, 24b and 24c are diagrams respectively showing spherical aberration, astigmatism and distortional aberration in a telescopic state of the zoom finder in the Embodiment 8;

FIGS. 25a, 25b and 25c are diagrams respectively showing spherical aberration, astigmatism and distortional aberration in an S-wide angle state of the zoom finder in Embodiment 9;

FIGS. 26a, 26b and 26c are diagrams respectively showing spherical aberration, astigmatism and distortional aberration in an S-telescopic state of the zoom finder in Embodiment 10;

FIGS. 27a, 27b and 27c are diagrams respectively showing spherical aberration, astigmatism and distortional aberration in a wide angle state of the zoom finder in Embodiment 11;

FIGS. 28a, 28b and 28c are diagrams respectively showing spherical aberration, astigmatism and distortional aberration in a mean state of the zoom finder in the Embodiment 11;

FIGS. 29a, 29b and 29c are diagrams respectively showing spherical aberration, astigmatism and distortional aberration in a telescopic state of the zoom finder in the Embodiment 11;

FIGS. 80a, 80b and 80c are diagrams respectively showing spherical aberration, astigmatism arid distortional aberration in an S-wide angle state of the zoom finder in the Embodiment 11;

FIGS. 31a, 31b and 81c are diagrams respectively showing spherical aberration, astigmatism arid distortional aberration in an S-telescopic state of the zoom finder in the Embodiment 11; and FIG. 82 is a view showing an image inverting system in Embodiment 12.

DESCRIPTION OF THE PREFERRED EMBODIMENTS

Figure 1:
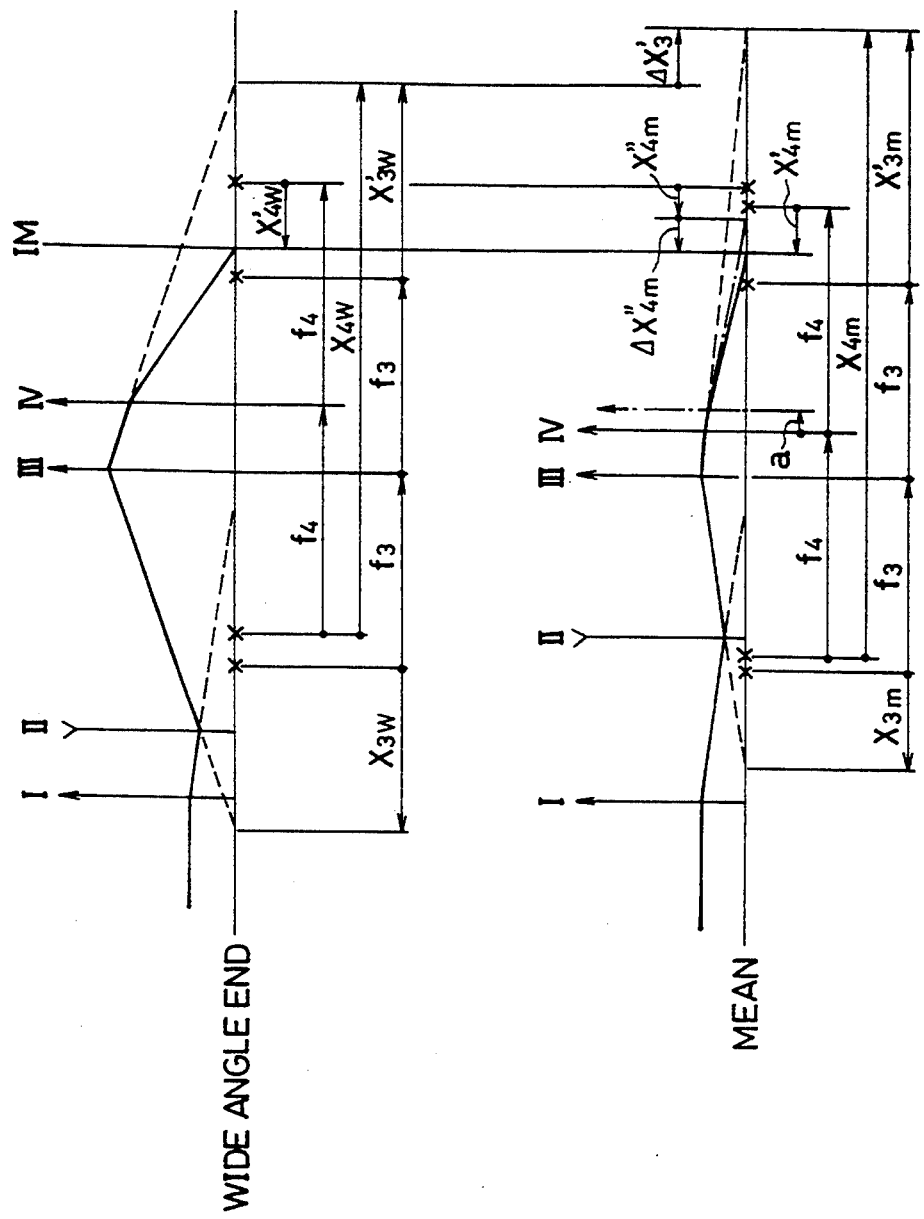
FIG. 1 is a view showing the arrangement of a zoom finder of a real image type having a first lens structure of the present invention with respect to refracting power.

The preferred embodiments of a zoom finder of a real image type and a real image type zoom finder capable of making a magnification transition in the present invention will next be described in detail with reference to the accompanying drawings.

A real image type zoom finder having a first lens structure of the present invention has an objective lens having positive refracting power and an eyepiece having positive refracting power.

The objective lens is constructed by first, second, third and fourth lens groups sequentially arranged from an object side. The first lens group has positive refracting power. The second lens group has negative refracting power. The third lens group has positive refracting power. The fourth lens group has positive refracting power. A real image is focused and formed by the objective lens between the fourth lens group and the eyepiece and is observed through the eyepiece.

The real image type zoom finder having the first lens structure is characterized in that a magnification of the zoom finder is increased by moving the second lens group from the object side to an eyepiece side, and a change in diopter caused by this increase in magnification is corrected by moving the fourth lens group.

A zoom finder of a real image type capable of making a magnification transition and having a second lens structure has the first lens structure and a converter lens for a low magnification transition.

The converter lens for a low magnification transition is constructed by negative and positive lenses and can be detachably attached to the real image type zoom finder. The converter lens is inserted between the second and third lens groups in a lowest magnification state of the real image type zoom finder so as to locate the negative lens of this converter lens on the object side so that the magnification of the zoom finder is changed to a magnification lower than the lowest magnification.

A zoom finder of a real image type capable of making a magnification transition and having a third lens structure has the first lens structure and a converter lens for a high magnification transition.

The converter lens for a high magnification transition is constructed by positive and negative lenses and can be detachably attached to the real image type zoom finder. The converter lens is inserted between the first and second lens groups in a highest magnification state of the real image type zoom finder so as to locate the positive lens of this converter lens on the object side so that the magnification of the zoom finder is changed to a magnification higher than the highest magnification.

A zoom finder of a real image type capable of making a magnification transition and having a fourth lens structure has the first lens structure, the converter lens for a low magnification transition in the second lens structure, and the converter lens for a high magnification transition in the third lens structure. The converter lens for a high magnification transition and the converter lens for a low magnification transition are selected and can be detachably attached to the real image type zoom finder having the first lens structure. The converter lens for a low magnification transition is inserted between the second and third lens groups in a lowest magnification state of the real image type zoom finder so as to locate the negative lens of this converter lens on the object side when the magnification of the zoom finder is changed to a magnification lower than the lowest magnification. The converter lens for a high magnification transition is inserted between the first and second lens groups in a highest magnification state of the real image type zoom finder so as to locate the positive lens of this converter lens on the object side when the magnification of the zoom finder is changed to a magnification higher than the highest magnification.

In a zoom finder of a real image type capable of making a magnification transition and having a fifth lens structure, a diopter of the zoom finder having the second lens structure is constantly held by moving the fourth lens group of the objective lens in an optical axis direction of the zoom finder when the converter lens for a low magnification transition is inserted into the zoom finder.

In a zoom finder of a real image type capable of making a magnification transition and having a sixth lens structure, a diopter of the zoom finder having the third lens structure is constantly held by moving the fourth lens group of the objective lens in an optical axis direction of the zoom finder when the converter lens for a high magnification transition is inserted into the zoom finder.

In a real image type zoom finder having a seventh lens structure, the diopter of a visual field in one of the first to sixth lens structures can be adjusted and set by moving the fourth lens group to an arbitrary diopter in an entire zooming region.

In a real image type zoom finder having an eighth lens structure, a visual field frame in the seventh lens structure can be moved such that a diopter of the visual field frame is in conformity with the diopner of the visual field.

A real image type zoom finder having a ninth lens structure has an objective lens having positive refracting power and an eyepiece having positive refracting power, The objective lens is constructed by first, second, third and fourth lens groups sequentially arranged from an object side. The first lens group has positive refracting power. The second lens group has negative refracting power. The third lens group has positive refracting power. The fourth lens group has positive refracting power. A real image is focused and formed between the fourth lens group and the eyepiece and is observed through the eyepiece.

The real image type zoom finder having the ninth lens structure is characterized in that a magnification of the zoom finder is increased by moving the second lens group from the object side to an eyepiece side, and a change in diopter caused by this increase in magnification is corrected by moving the eyepiece. An entire length of the real image type zoom finder having the ninth lens structure is changed by a zooming operation since the diopter of the zoom finder caused by the zooming operation is corrected by displacing the eyepiece.

In a zoom finder of a real image type having a tenth lens structure, a visual field frame in the tenth lens structure can be moved to correct a change in diopter of the visual field frame caused by moving the eyepiece.

A zoom finder of a real image type having an eleventh lens structure has the ninth lens structure and a converter lens for a low magnification transition.

The converter lens for a low magnification transition is constructed by negative and positive lenses and can be detachably attached to the real image type zoom finder, The converter lens is inserted between the second and third lens groups in a lowest magnification state of the real image type zoom finder so as to locate the negative lens of this converter lens on the object side so that the magnification of the zoom finder is changed to a magnification lower than the lowest magnification.

A zoom finder of a real image type having a twelfth lens structure has the ninth lens structure and a converter lens for a high magnification transition.

The converter lens for a high magnification transition is constructed by positive and negative lenses and can be detachably attached to the real image type zoom finder. The converter lens is inserted between the first and second lens groups in a highest magnification state of the real image type zoom finder so as to locate the positive lens of this converter lens on the object side so that the magnification of the zoom finder is changed to a magnification higher than the highest magnification.

A zoom finder of a real image type having a thirteenth lens structure has the ninth lens structure, the converter lens for a low magnification transition in the eleventh lens structure, and the converter lens for a high magnification transition in the thirteenth lens structure.

The converter lens for a low magnification transition is inserted between the second and third lens groups in a lowest magnification state of the real image type zoom finder so as to locate the negative lens of this converter lens on the object side when the magnification of the zoom finder is changed to a magnification lower than the lowest magnification. The converter lens for a high magnification transition is inserted between the first and second lens groups in a highest magnification state of the real image type zoom finder so as to locate the positive lens of this converter lens on the object side when the magnification of the zoom finder is changed to a magnification higher than the highest magnification.

In a zoom finder of a real image type having a fourteenth lens structure, a diopter of the zoom finder having the eleventh lens structure is constantly held by moving the eyepiece in an optical axis direction of the zoom finder when the converter lens for a low magnification transition is inserted into the zoom finder, In a zoom finder of a real image type having a fifteenth lens structure, a diopter of the zoom finder having the twelfth lens structure is constantly held by moving the eyepiece in an optical axis direction of the zoom finder when the converter lens for a high magnification transition is inserted into the zoom finder.

In a zoom finder of a real image type having a sixteenth lens structure, a visual field frame in the fourteenth lens structure can be moved in the optical axis direction at an inserting time of the converter lens for a low magnification transition such that diopters of a visual field and the visual field frame are constantly held.

In a zoom finder of a real image type having a seventeenth lens structure, a visual field frame in the fifteenth lens structure can be moved in the optical axis direction at an inserting time of the converter lens for a high magnification transition such that diopters of a visual field and the visual field frame are constantly held.

In an eighteenth lens structure of the real image type zoom finder, the diopter of a visual field in one of the ninth to seventeenth lens structures can be adjusted and set by moving the eyepiece to an arbitrary diopter in an entire zooming region.

In a nineteenth lens structure of the real image type zoom finder, an image inverting system can be disposed on an eye pupil side of the objective lens in the eighteenth lens structure. A portion or all of this image inverting system are constructed by a prism. A prism portion near an image face of the objective lens can be set to have an aspherical surface. In this case, the prism of the image inverting system preferably has a refractive index equal to or greater than 1.5 in a twentieth lens structure of the real image type zoom finder.

As mentioned above, in the real image type zoom finder of the present invention, the objective lens is constructed by first to fourth lens groups sequentially arranged from an object side to an eyepiece side. These first, second, third and fourth lens groups respectively have positive, negative, positive and positive refracting powers. A zooming operation of the zoom finder is performed by displacing the second lens group having negative refracting power. In the real image: type zoom finder having each of the first to eighth lens structures, a change in diopter caused by the zooming operation is corrected by moving the fourth lens group. In the real image type zoom finder having each of the ninth to eighteenth lens structures, the change in diopter caused by the zooming operation is corrected by moving the eyepiece.

In the arrangement of the above positive, negative, positive and positive refracting powers of the objective lens, a light beam from an object is changed to a convergent light beam by the first lens group and is changed to a divergent light beam by the second lens group. The light beam is again changed to a convergent light beam by the third and fourth lens groups. In this case, it is desirable to correct aberrations that the divergent light beam obtained by the second lens group is changed to the convergent light beam by the third lens group and is further converged by the fourth lens group to form an image.

Therefore, it is preferable to set a magnification $M_{4w}$ of the fourth lens group at the wide angle end of the zoom finder such that this magnification satisfies the following condition (1).

$$0 < M_{4w} < 1 \tag{1}$$

In the following description, $M_{2t}$ and $M_{2w}$ respectively designate magnifications of the second lens group for performing the zooming operation at the telescopic and wide angle ends the zoom finder. When the magnifications $M_{2t}$ and $M_{2w}$ satisfy the Following condition (2), $$M_{2w} \approx 1/M_{2t} \tag{2}$$

the changing amount of a back focus of the objective lens is minimized when only the second lens group is moved.

Accordingly, when a zoom ratio is set to Z, the above magnifications $M_{2w}$ and $M_{2t}$ of the second lens group in the real image type zoom finder of the present invention are desirably set as follows.

$$M_{2w} \approx \sqrt{(Z)} \tag{3}$$

$$M_{2t} \approx 1/\sqrt{(Z)} \tag{4}$$

At this time, when a magnification $M_{2m}$ of the second lens group in a mean state of the zoom finder is set to satisfy the following condition (5), $$M_{2m} \approx 1 \tag{5}$$

arrangements of refracting power of the objective lens at the wide angle end of the zoom finder and mean position thereof are provided as shown in FIG. 1. In FIG. 1, reference numerals I, II, III and IV respectively designate the first, second, third and fourth lens groups. Further, reference numeral IM designates a paraxial image face of the objective lens.

In the following description, reference numeral a designates a moving amount of the fourth lens group IV when the fourth lens group is moved from the wide angle end to a mean position. Reference numeral $f_4$ designates a focal length of the fourth lens group. Reference numeral $\Delta X_3'$ designates a changing amount of a rear focal point position of a combined system of the first, second and third lens groups while the fourth lens group is moved from the wide angle end to the mean position with the wide angle end as a reference. In this case, the moving amount a, the focal length $f_4$ and the changing amount $\Delta X_3'$ satisfy the following condition (6).

$$M_{4w} \cdot a^2 + (f_4 + f_4 \cdot M_{4w}^2 - \Delta X_3' \cdot M_{4w}) \cdot a - \Delta X_3' \cdot f_4 \cdot M_{4w}^2 \approx 0 \quad (6)$$

The changing amount of the fourth lens group IV is provided by value a satisfying the above conditional formula (6).

When both sides of the formula (6) are divided by $f_4$, the formula (6) are rewritten as follows.

$$\{-M_{4w} \cdot a^2 - \Delta X_3' \cdot M_{4w} \cdot a\}/f_4 + (M_{4w}^2 - 1) \cdot a + \Delta X_3' \cdot M_{4w}^2 \approx 0 \quad (7)$$

In this case, when $a \ll f_4$ and $\Delta X_3' \ll f_4$, the first term of the above formula (7) is approximately equal to zero. Namely, the following condition (8) is set.

$$\{-M_{4w} \cdot a^2 - \Delta X_3' \cdot M_{4w} \cdot a\}/f_4 \approx 0 \quad (8)$$

In this condition, the above formula (7) is solved with respect to value a so that this value a is simply provided as follows.

$$a = \Delta X_3' \cdot M_{4w}^2 / (1 - M_{4w}^2) \quad (9)$$

When no fourth lens group IV is displaced and image points of the objective lens at the wide angle end of the zoom finder and in the mean position of the zoom finder are separated from each other by a distance $\Delta X_{4M}''$, this distance $\Delta X_{4M}''$ is represented by the following formula (10) when the above amount $\Delta X_3$ is small.

$$\Delta X_{4M}'' \approx \Delta X_3' \cdot M_{4w}^2 \quad (10)$$

Accordingly, the moving amount a of the fourth lens group IV is preferably set to satisfy the following condition (11), $$a = \Delta X_{2M}'' / (1 - M_{4w}^2) \quad (11)$$

to constantly hold a diopter of the zoom finder. If the magnification $M_{4w}$ of the fourth lens group is set to satisfy the above formula (1), it should be understood that the moving amount a is reduced as the magnification $M_{4w}$ is reduced.

A focal length $f_1$ of the first lens group I and a focal length $f_2$ of the second lens group II are desirably set to satisfy the following condition so as to suitably hold a distance between the first lens group I and the second lens group II.

$$2.0 < |f_1/f_2| < 3.5$$

When the ratio in this condition exceeds a lower limit thereof, the distance between the first and second lens groups is excessively reduced so that it is difficult to suitably arrange lenses. In contrast to this, when the ratio in this condition exceeds an upper limit thereof, the distance between the first and second lens groups is excessively increased so that a lens diameter of the first lens group I is increased and is not practical and it is difficult to correct aberrations.

Figure 2:
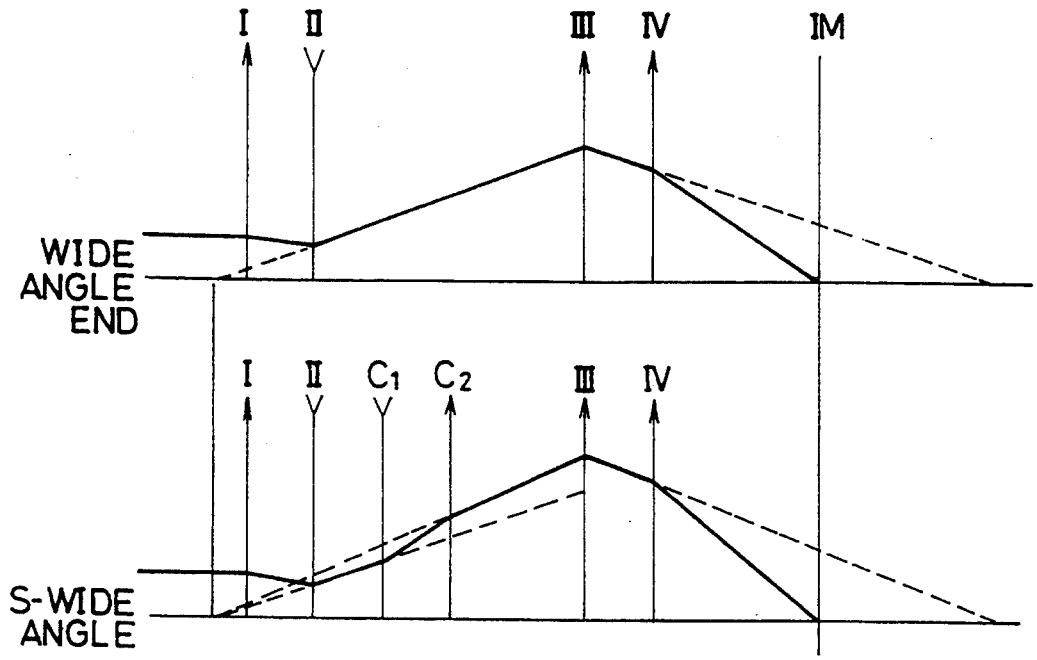
FIG. 2 is a view showing an arrangement of the zoom finder with respect to refracting power when a converter lens for a low magnification transition is inserted into the zoom finder at a wide angle end thereof.

An upper portion of FIG. 2 shows an arrangement of refracting power of the objective lens at the wide angle end of the real image type zoom finder shown in FIG. 1. In this state, FIG. 2 also shows an arrangement of refracting power of the objective lens at an S-wide angle end of the zoom finder when a converter lens for a low magnification transition has concave and convex faces and is inserted between the second lens group II and the third lens group III.

Figure 3:
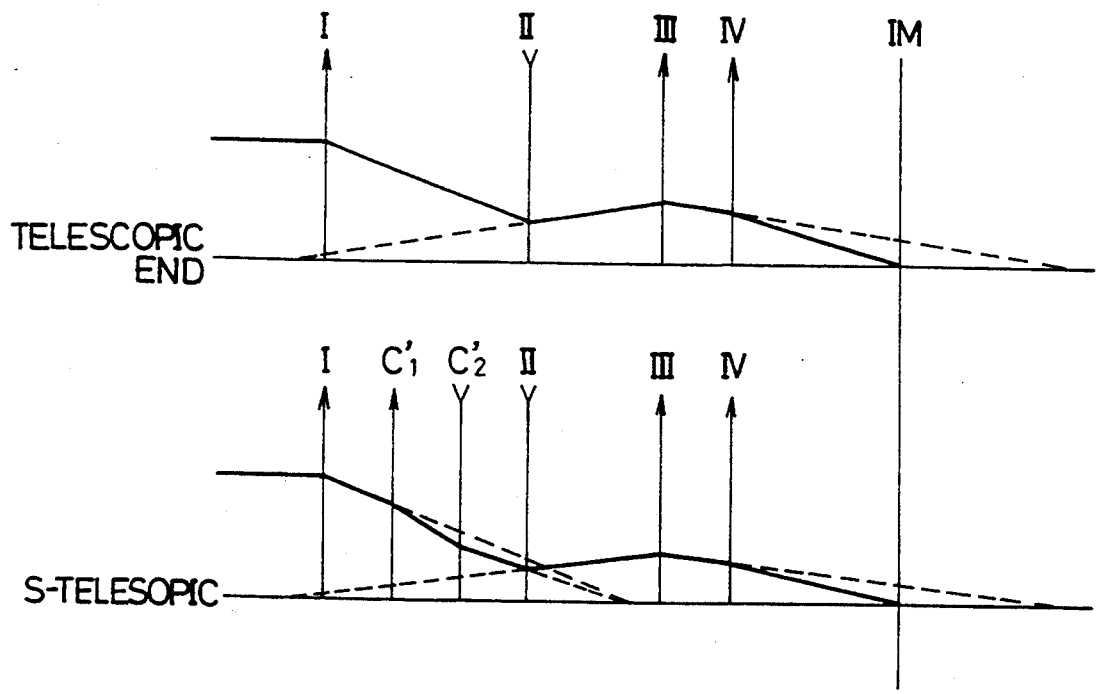
FIG. 3 is a view showing an arrangement of the zoom finder with respect to refracting power when a converter lens for a high magnification transition is inserted into the zoom finder at a telescopic end thereof.

An upper portion of FIG. 3 shows an arrangement of refracting power of the objective lens at the telescopic end of the real image type zoom finder shown in FIG. 1. In this state, FIG. 3 also shows an arrangement of refracting power of the objective lens at an S-telescopic end of the zoom finder when a converter lens for a low magnification transition has convex and concave faces and is inserted between the second lens group II and the third lens group III.

In a lowest magnification state of the real image type zoom finder, a converter lens is added to make a lower magnification transition and is in principle constructed by using a lens having a concave face on an object side and a convex face on an eyepiece side. In contrast to this, in a highest magnification state of the real image type zoom finder, a converter lens is added to make a higher magnification transition and is in principle constructed by using a lens having a convex face on the object side and a concave face on the eyepiece side. When such a converter lens is used, focal lengths of the zoom finder can be changed or transited while a focusing position of the objective, lens is invariably held. However, the converter lens has four degrees of freedom composed of refracting powers of the converter lens on first and second faces thereof and positions of these first and second faces. Two of these four degrees of freedom are used to hold the focusing position of the objective lens and change focal lengths of the converter lens. Accordingly, the remaining two degrees are used to correct aberrations. However, it is difficult to correct the aberrations by using the remaining two degrees of freedom of the converter lens since the refracting powers of the converter lens on the first and second faces thereof are increased.

In a real image type zoom finder capable of making a magnification transition and having each of second and fourth lens structures, a converter lens for a low magnification transition is constructed by a negative lens on an object side and a positive lens on an eyepiece side. A magnification of the zoom finder is changed to a lower magnification at the S-wide angle end thereof while a diopter of the zoom finder is constantly held before and after the converter lens is inserted into the zoom finder. Thus, it is possible to prevent image forming performance of the zoom finder from being reduced.

In a real image type zoom finder capable of making a magnification transition and having each of third and fourth lens structures, a converter lens for a high magnification transition is constructed by a positive lens on an object side and a negative lens on an eyepiece side. A magnification of the zoom finder is changed to a higher magnification at the S-telescopic end thereof while a diopter of the zoom finder is constantly held before and after the converter lens is inserted into the zoom finder. Thus, it is possible to prevent image forming performance of the zoom finder from being reduced.

In a real image type zoom finder capable of making a magnification transition and having each of fifth and sixth lens structures, the fourth lens group of the objective lens is displaced in an optical axis direction of the zoom finder when the above converter lens for a low or high magnification transition is used. The fourth lens group can be moved as a dioptric correcting lens in the real image type zoom finder. Accordingly, the fourth lens group can be also moved when the converter lens is inserted into the zoom finder. Therefore, a degree of freedom in correction of aberrations is increased by displacing the fourth lens group to correct the aberrations when the converter lens is inserted into the zoom finder. Accordingly, it is possible to further improve image forming performance of the zoom finder.

In the real image type zoom finder having each of the first to sixth lens structures, the diopter of the zoom finder in a visual field thereof can be adjusted and set to a diopter for easily making an observer look into the finder by using the movement of the fourth lens group as a moving lens group in accordance with a seventh lens structure of the present invention. This dioptric adjustment is made by changing the position of a focal point of the objective lens. Accordingly, a dioptric shift is caused by a shift between the position of a visual field frame and the position of the focal point of the objective lens. Therefore, in a real image type zoom finder having an eighth lens structure of the present invention, the visual field frame can be moved in the optical axis direction of the zoom finder. In this eighth lens structure, the dioptric shift can be corrected by displacing the position of the visual field frame in accordance with the displacement of the focal point position of the objective lens.

In the real image type zoom finder having each of the first to eighth lens structures, the zooming operation is performed by displacing the second lens group of the objective lens. A change in diopter caused by this displacement is corrected by moving the fourth lens group. Therefore, no entire length of the zoom finder is changed by performing the zooming operation. However, it is necessary to secure a space for moving the second and fourth lens groups in advance since the second and fourth lens groups inside a lens system of the zoom finder are displaced. Accordingly, the structure of a mechanism for displacing these lens groups is slightly complicated. Therefore, in a real image type zoom finder having a ninth lens structure of the present invention, only the zooming operation is performed by using only the second lens group as a moving lens group in the objective lens. The diopter of tile zoom finder is corrected by displacing an eyepiece. Since the eyepiece is arranged at a terminal end of the lens system, it is not necessary to secure a space for moving the eyepiece in advance so that the structure of a lens moving mechanism is simplified.

As mentioned above, in the real image type zoom finder having each of the ninth and subsequent lens structures of the present invention, the third and fourth lens groups are set to fixed lens groups in the objective lens so that the third and fourth lens groups may be considered to be a third lens group as a whole. Accordingly, each of the ninth and subsequent lens structures can be also applied to a real image type zoom finder having the third and fourth lens groups as a single third lens group equivalent to these third and fourth lens groups, an objective lens constructed by positive, negative and positive lens groups, and an eyepiece having negative refracting power.

In a real image type zoom finder having a tenth lens structure of the present invention, similar to the eighth lens structure, a change in diopter of the visual field frame caused at a time of the zooming operation is corrected by displacing the visual field frame in the optical axis direction of the zoom finder. Further, in the real image type zoom finder having each of the ninth and tenth lens structures, similar to the second to fourth lens structures, it is possible to change or transit magnifications by attaching and detaching a converter lens from the zoom finder in accordance with each of eleventh, twelfth and thirteenth lens structures of the present invention. In a real image type zoom finder having each of fourteenth and fifteenth lens structures of the present invention, a diopter of the zoom finder is corrected by moving an eyepiece so that performance of the zoom finder is improved in comparison with a case in which the diopter is corrected by using only a converter lens.

In a real image type zoom finder having each of sixteenth and seventeenth lens structures of the present invention, the visual field frame can be displaced to correct a shift in diopter thereof caused by moving the eyepiece. Further, in a real image type zoom finder having an eighteenth lens structure of the present invention, the eyepiece is moved in the optical axis direction of the zoom finder to set a diopter such that an observer can easily look into the finder at this diopter.

In a real image type zoom finder having a nineteenth lens structure of the present invention, an image inverting system is disposed on an eye pupil side of the objective lens. A portion or all of the image inverting system are constructed by a prism. A condenser lens is normally disposed in the vicinity of an image forming face of the objective lens such that a light beam from the objective lens is effectively transmitted to an eye point. In the real image type zoom finder having the nineteenth lens structure, a prism face near the image forming face of the objective lens is curved to use the prism face as the above condenser lens. Further, this prism face is set to be aspherical so as to improve performance of the zoom finder outside an optical axis thereof. This technique is used in the present invention, but can be widely applied to a real image type finder constructed by an objective lens and an eyepiece each having positive refracting power.

The image inverting system constructed by a prism is used in the real image type zoom finder having the nineteenth lens structure. When this image inverting system is used, a refractive index of the prism is preferably equal to or greater than 1.5 in accordance with a twentieth lens structure of the present invention. In this case, light can be totally reflected effectively on a reflecting face of this prism so that no evaporation is required on this reflecting face. Accordingly, the brightness of a visual field is increased in comparison with a case in which an evaporated reflecting face of the prism is formed. When the prism is formed by a material having a refractive index smaller than the above refractive index, light is totally reflected on the reflecting face of the prism so that an angle formed between this light and a normal line on the reflecting face is excessively increased. Accordingly, it is impossible to provide a sufficient diameter of a light beam in a position of the eye point.

FIG. 4 shows a lens construction of the real image type zoom finder having the first lens structure in accordance with one embodiment of the present invention. As mentioned above, reference numerals I to IV respectively designate first to fourth lens groups of the objective lens. Each of image inverting prisms 5 and 6 is used to invert an observed image to an erect image. A lens 7 constitutes an eyepiece. Magnifications of the zoom finder are changed from a wide angle state to a telescopic state by displacing the second lens group II from an object side to an eyepiece side.

As shown in FIG. 4, in this embodiment, each of the third lens group III and the fourth lens group IV is constructed by a single convex lens. The fourth lens group IV has an aspherical surface on an object side thereof to mainly correct aberrations outside an optical axis of the zoom finder.

As mentioned above, the magnification $M_{4w}$ of the fourth lens group is reduced to reduce the displacing amount a of the fourth lens group so as to correct a change in diopter caused by a zooming operation. A method for reducing the magnification $M_{4w}$ is constructed by two methods composed of a method for increasing refracting power of the fourth lens group and a method for moving the fourth lens group toward the third lens group. In the former method, an amount of aberrations is increased by the increase in refracting power of the fourth lens group so that image forming performance is deteriorated. Accordingly, it is desirable to use the latter method.

As mentioned above, aberrations outside the optical axis of the zoom finder are desirably corrected on the aspherical surface of the fourth lens group in the vicinity of image faces separated from each other in accordance with a field angle. In such a condition, it is preferable to separate the third and fourth lens groups from each other. This separation contradicts the above latter method for moving the fourth lens group toward the third lens group. In this embodiment, the fourth lens group is suitably arranged generally in consideration of refracting powers of the third and fourth lens groups, a moving amount of the fourth lens group, a space for the image inverting prism 5, etc.

As shown in FIG. 4, reference numeral $R_i$ (i=1 to 16) designates a radius of curvature of an i-th lens face counted from an object side toward an eyepiece side. The object side is set to a left-hand side in FIG. 4. Reference numeral $D_i$ (i=1 to 15) designates a distance between the i-th lens face and an (i+1)-th lens face on the optical axis of the zoom finder. Reference numerals $N_j$ and $\nu_j$ respectively designate a refractive index and an Abbe's number of the material of a j-th optical element counted from the object side. These values are provided as follows in accordance with Embodiment 1.

| i | $R_i$ | $D_i$ | j | $N_j$ | $\nu_j$ |
|---|---|---|---|---|---|
| 1 | 20.063 | 2.690 | 1 | 1.49154 | 57.82 |
| 2 | −27.373 | variable | | | |

-continued

| i | $R_i$ | $D_i$ | j | $N_j$ | $\nu_j$ |
|---|---|---|---|---|---|
| 3 | 14.004 | 1.040 | 2 | 1.49154 | 57.82 |
| 4 | 4.418 | 2.820 | | | |
| 5 | −4.938 | 1.030 | 3 | 1.49154 | 57.82 |
| 6 | −9.726 | variable | | | |
| 7 | 10.101 | 2.130 | 4 | 1.58500 | 29.30 |
| 8 | −29.529 | variable | | | |
| 9 | 17.798 | 2.520 | 5 | 1.49154 | 57.82 |
| 10 | −13.587 | variable | | | |
| 11 | ∞ | 13.790 | 6 | 1.49154 | 57.82 |
| 12 | ∞ | 4.787 | | | |
| 13 | 14.981 | 27.500 | 7 | 1.49154 | 57.82 |
| 14 | ∞ | 0.300 | | | |
| 15 | 36.904 | 2.200 | 8 | 1.49454 | 57.82 |
| 16 | −19.251 | 15.000 | | | |

Each of first, fourth, fifth, tenth and thirteenth lens faces of this lens system counted from the object side is constructed by an aspherical surface. In the following description, reference numerals R and H respectively designate a radius of curvature of the aspherical surface on the optical axis, and a height of the aspherical surface from the optical axis. Reference numeral X designates a coordinate on the aspherical surface in an optical axis direction corresponding to the height H. Reference numeral K designates a conical constant. Reference numerals A, B, C and D respectively designate aspherical coefficients of second, fourth, sixth and eighth orders. In this case, the aspherical surface is equal to a curved surface represented by the following formula.

$$X = [(H^2/R)/\{1+\sqrt{(Y)}\}] + A \cdot H^2 + B \cdot H^4 + C \cdot H^6 + D \cdot H^8,$$
$$Y = 1 - (1+K) \cdot (H^2/R^2)$$

A shape of each of the above aspherical surfaces is specified by providing the conical constant K and the aspherical coefficients A, B, C and D of higher orders. "E-number" in the aspherical coefficients of higher orders shows a power. For example, E-10 shows $1/10^{10}$ and this number $1/10^{10}$ is multiplied by a number before this number $1/10^{10}$.

Aspherical surfaces

First face K=−2.049, A=0.0, B=−7.25E−5, C=−9.19E−7 D=7.03E−10

Fourth face K=−0.180, A=0.0, B=−7.21E−5, C=4.01E−6 D=1.01E−6

Fifth face K=−0.518, A=0.0, B=−6.29E−5, C=9.17E−5 D=8.11E−7

Tenth face K=2.328, A=0.0 B=6.13E−4, C=7.96E−6 D≦0.0

Thirteenth face K=−29.343, A=0.0, B=2.45E−4, C=−3.88E−6 D=0.0

Variable amounts

State of shortest focal length (wide angle stale) $D_2$=0.263, $D_6$=8.287, $D_8$=3.580, $D_{10}$=1.340

State of intermediate focal length (mean state) $D_2$=4.108, $D_6$=4.442, $D_8$=3.0, $D_{10}$=1.920

State of longest focal length (telescopic state) $D_2$=8.287, $D_6$=0.263, $D_8$=3.580, $D_{10}$=1.340

Embodiment 2

FIG. 5 shows an arranging state of the real image type zoom finder in the Embodiment 1 in which a converter lens for a low magnification transition is inserted between the second and third lens groups of the objective lens (within a lens face distance $D_6$) in a lowest magnification state of the zoom finder at a wide angle end thereof.

As shown in FIG. 5, this converter lens for a low magnification transition is constructed by two lens groups composed of a lens $C_1$ having negative refracting power and arranged on the object side and a lens $C_2$ having positive refracting power and arranged on the eyepiece side. In FIG. 5, reference numeral $Rc_i$ ($i=1$ to 4) designates a radius of curvature of each of lens faces of the converter lens between the second and third lens groups. Reference numeral $Dc_i$ ($i=0$ to 4) designates a distance between these lens faces. Reference numerals $Nc_j$ and $vc_j$ ($j=1$ to 2) respectively designate a refractive index and an Abbe's number of a j-th lens counted from a side of the first lens group. These values are provided as follows in accordance with Embodiment 2.

| i | $Rc_i$ | $Dc_i$ | j | $Nc_j$ | $vc_j$ |
|---|--------|--------|---|--------|--------|
| 0 |        | 1.000  |   |        |        |
| 1 | −5.324 | 2.050  | 1 | 1.58500 | 29.30 |
| 2 | 5.324  | 0.300  |   |        |        |
| 3 | 6.407  | 1.920  | 2 | 1.49154 | 57.82 |
| 4 | −6.039 | 3.017  |   |        |        |

Embodiment 3

FIG. 6 shows an arranging state of the real image type zoom finder in the Embodiment 1 in which a converter lens for a high magnification transition is inserted between the first and second lens groups of the objective lens (within a lens face distance $D_2$) in a highest magnification state of the zoom finder at a telescopic end thereof. As shown in FIG. 6, this converter lens for a high magnification transition is constructed by two lens groups composed of a lens $C_1'$ having positive refracting power and arranged on the object side and a lens $C_2'$ having negative refracting power and arranged on an eye pupil side. In FIG. 5, reference numeral $Rc_i'$ ($i=1$ to 4) designates a radius of curvature of each of lens faces of the converter lens between the first and second lens groups. Reference numeral $Dc_i'$ ($i=0$ to 4) designates a distance between these lens faces. Reference numerals $Nc_j'$ and $vc_j'$ ($j=1$ to 2) respectively designate a refractive index and an Abbe's number of a j-th lens counted from a side of the First lens group. These values are provided as follows in accordance with Embodiment 3.

| i | $Rc_i'$ | $Dc_i'$ | j | $Nc_j'$ | $vc_j'$ |
|---|---------|---------|---|---------|---------|
| 0 |         | 1.585   |   |         |         |
| 1 | 9.500   | 1.518   | 1 | 1.49154 | 57.82   |
| 2 | 75.348  | 1.843   |   |         |         |
| 3 | 18.000  | 1.355   | 2 | 1.58500 | 29.30   |
| 4 | 4.686   | 1.986   |   |         |         |

The following Embodiment 4 and 5 are embodiments of the real image type zoom finder capable of making a magnification transition and having each of fifth and sixth lens structures.

Embodiment 4

A converter lens for a low magnification transition in this Embodiment 4 is constructed by two lens groups composed of negative and positive lenses. This converter lens is inserted between the second and third lens groups in the lowest magnification state of the real image type zoom finder in the Embodiment 1. A difference between the Embodiment 2 and 4 is that a diopter of the zoom finder is constantly held by displacing the fourth lens group of the objective lens when the converter lens for a low magnification transition is inserted between the second and third lens groups.

Similar to the Embodiment 2, reference numeral $Rc_i$ ($i=1$ to 4) designates a radius of curvature of each of lens faces of the above converter lens between the second and third lens groups. Reference numeral $Dc_i$ ($i=0$ to 4) designates a distance between these lens faces. Reference numerals $Nc_j$ and $vc_j$ ($j=1$ to 2) respectively designate a refractive index and an Abbe's number of a j-th lens counted from a side of the first lens group. These values are provided as follows in accordance with Embodiment 4.

| i | $Rc_i$ | $Dc_i$ | j | $Nc_j$ | $vc_j$ |
|---|--------|--------|---|--------|--------|
| 0 |        | 1.000  |   |        |        |
| 1 | −4.794 | 2.416  | 1 | 1.58500 | 29.30 |
| 2 | 4.761  | 0.300  |   |        |        |
| 3 | 5.715  | 1.859  | 2 | 1.49154 | 57.82 |
| 4 | −5.194 | 2.712  |   |        |        |

After the fourth lens group is displaced in an optical axis direction off the zoom finder, the values of lens face distances $D_2$, $D_6$, $D_8$ and $D_{10}$ are set to the following values. $D_2 = 0.263$, $D_6 = 8.287$, $D_8 = 4.820$, $D_{10} = 0.1$

Embodiment 5

A converter lens for a high magnification transition an this Embodiment 5 is constructed by two lens groups composed of positive and negative lenses. This converter lens is inserted between the first and second lens groups in the highest magnification state of the real image type zoom finder in the Embodiment 1. A diopter of the zoom finder is constantly held by displacing the fourth lens group of the objective lens in a state in which the converter lens for a high magnification transition is inserted between the first and second lens groups.

Similar to the Embodiment 3, reference numeral $Rc_i'$ ($i=1$ to 4) designates a radius of curvature of each of lens faces of the above converter lens between the first and second lens groups. Reference numeral $Dc_i'$ ($i=0$ to 4) designates a distance between these lens faces. Reference numerals $Nc_j'$ and $vc_j'$ ($j=1$ to 2) respectively designate a refractive index and an Abbe's number of a j-th lens counted from a side of the first lens group. These values are provided as follows in accordance with Embodiment 5.

| i | $Rc_i'$ | $Dc_i'$ | j | $Nc_j'$ | $vc_j'$ |
|---|---------|---------|---|---------|---------|
| 0 |         | 1.500   |   |         |         |
| 1 | 6.996   | 2.237   | 1 | 1.49154 | 57.82   |
| 2 | −27.696 | 0.526   |   |         |         |
| 3 | −27.516 | 1.347   | 2 | 1.58500 | 29.30   |
| 4 | 5.006   | 2.676   |   |         |         |

After the fourth lens group is displaced in an optical axis direction of the zoom finder, the values of lens face distances $D_2$, $D_6$, $D_8$ and $D_{10}$ are set to the following values. $D_2 = 8.287$, $D_6 = 0.263$, $D_8 = 3.836$, $D_{10} = 1.084$ FIGS. 7a, 7b and 7c are diagrams respectively showing spherical aberration, astigmatism and distortional aberration at a wide angle end of the real image type zoom finder in the Embodiment 1. FIGS. 8a, 8b and 8c are diagrams respectively showing spherical aberration, astigmatism and distortional aberration in a mean position of the real image type zoom finder in the Embodiment 1. FIGS. 9a, 9b and 9c are diagrams respectively showing spherical aberration, astigmatism and distortional aberration at a telescopic end of the real image type zoom finder in the Embodiment 1. FIGS. 10a, 10b and 10c are diagrams respectively showing spherical aberration, astigmatism and distortional aberration in an S-wide angle state of the real image type zoom finder in the Embodiment 2. FIGS. 11a, 11b and 11c are diagrams respectively showing spherical aberration, astigmatism and distortional aberration in an S-telescopic state of the real image type zoom finder in the Embodiment 3. FIGS. 12a, 12b and 12c are diagrams respectively showing spherical aberration, astigmatism and distortional aberration in an S-wide angle state of the real image type zoom finder in the Embodiment 4. FIGS. 13a, 13b and 13c are diagrams respectively showing spherical aberration, astigmatism and distortional aberration in an S-telescopic state of the real image type zoom finder in the Embodiment 5. Performance of the real image type zoom finder is preferably improved in each of these Embodiments.

Embodiment 6

The Embodiment 6 is an embodiment of the real image type zoom finder having the seventh lens structure in which the diopter of a visual field is adjusted and set to 0 dpt by moving the fourth lens group of the objective lens in each of the above Embodiment 1, 4 and 5. The diopter of the visual field is adjusted and set to 0 dpt in all of the wide angle, mean, telescopic, S-wide angle and S-telescopic states. At this time, the fourth lens group is moved by 0.54 mm onto the object side in comparison with the Embodiment 1.

Lens face distances $D_2$, $D_6$, $D_8$ and $D_{10}$ in the wide angle, mean and telescopic states are provided as follows in accordance With Embodiment 6.

|  | WIDE | MEAN | TELE |
| --- | --- | --- | --- |
| $D_2$ | 0.263 | 4.108 | 8.287 |
| $D_6$ | 8.287 | 4.442 | 0.263 |
| $D_8$ | 3.04 | 2.46 | 3.04 |
| $D_{10}$ | 1.88 | 2.46 | 1.88 |

Lens face distances $D_2$, $D_6$, $D_8$ and $D_{10}$ in the S-wide angle state are provided as follows when the converter lens in the above Embodiment 4 is used. Further, lens face distances $D_2$, $D_6$, $D_8$ and $D_{10}$ in the S-telescopic state are provided as follows when the converter lens in the above Embodiment 5 is used.

|  | S-WIDE | S-TELE |
| --- | --- | --- |
| $D_2$ | 0.263 | 8.287 |
| $D_6$ | 8.287 | 0.263 |
| $D_8$ | 4.28 | 3.296 |
| $D_{10}$ | 0.64 | 1.624 |

FIGS. 14a, 14b and 14c respectively show spherical aberration, astigmatism and distortional aberration in the above wide angle state of the real image type zoom finder. FIGS. 15a, 15b and 15c respectively show spherical aberration, astigmatism and distortional aberration in the above mean state of the real image type zoom finder. FIGS. 16a, 16b and 16c respectively show spherical aberration, astigmatism and distortional aberration in the above telescopic state of the real image type zoom finder. FIGS. 17a, 17b and 17c respectively show spherical aberration, astigmatism and distortional aberration in the above S-wide angle state of the real image type zoom finder. FIGS. 18a, 18b and 18c respectively show spherical aberration, astigmatism and distortional aberration in the above S-telescopic state of the real image type zoom finder.

Embodiment 7

The Embodiment 7 is an embodiment of the real image type zoom finder having the eighth lens structure in which the diopter of a visual field and the diopter of a visual field frame are adjusted and set to—2 dpt by moving the fourth lens group of the objective lens in the above Embodiment 1. At this time, the fourth lens group is moved by 0.52 mm onto the eyepiece side in comparison with the Embodiment 1. In the Embodiment 1 the visual field frame is arranged near a face (as a twelfth face) of the image inverting prism 5 on the eyepiece side thereof. However, in this Embodiment 7, the visual field frame is moved by 0.47 mm onto the eyepiece side such that the diopter of the visual field frame is in conformity with the above adjusted diopter of the visual field. At this time, lens face distances $D_2$, $D_6$, $D_8$ and $D_{10}$ in the wide angle, mean and telescopic states are provided as follows in accordance: with Embodiment 7.

|  | WIDE | MEAN | TELE |
| --- | --- | --- | --- |
| $D_2$ | 0.263 | 4.108 | 8.287 |
| $D_6$ | 8.287 | 4.442 | 0.263 |
| $D_8$ | 4.1 | 3.52 | 4.1 |
| $D_{10}$ | 0.82 | 1.4 | 0.82 |

FIGS. 19a, 19b and 19c respectively show spherical aberration, astigmatism and distortional aberration in the above wide angle state of the real image type zoom finder. FIGS. 20a, 20b and 20c respectively show spherical aberration, astigmatism and distortional aberration in the above mean state of the real image type zoom finder. FIGS. 21a, 21b and 21c respectively show spherical aberration, astigmatism and distortional aberration in tile above telescopic state of the real image type zoom finder.

Embodiment 8

The Embodiment 8 is an embodiment of the real image type zoom finder having each of the ninth and tenth lens structures.

| i | $R_i$ | $D_i$ | j | $N_j$ | $v_j$ |
| --- | --- | --- | --- | --- | --- |
| 1 | 20.063 | 2.690 | 1 | 1.49154 | 57.82 |
| 2 | −27.373 | variable |  |  |  |
| 3 | 14.004 | 1.040 | 2 | 1.49154 | 57.82 |
| 4 | 4.418 | 2.820 |  |  |  |
| 5 | −4.938 | 1.030 | 3 | 1.49154 | 57.82 |
| 6 | −9.726 | variable |  |  |  |
| 7 | 10.101 | 2.130 | 4 | 1.58500 | 29.30 |
| 8 | −29.529 | variable |  |  |  |
| 9 | 17.798 | 2.520 | 5 | 1.49154 | 57.82 |
| 10 | −13.587 | 1.34 |  |  |  |
| 11 | ∞ | 13.790 | 6 | 1.49154 | 57.82 |
| 12 | ∞ | 4.787 |  |  |  |
| 13 | 14.981 | 25.263 | 7 | 1.49154 | 57.82 |
| 14 | ∞ | variable |  |  |  |
| 15 | 36.904 | 2.200 | 8 | 1.49454 | 57.82 |
| 16 | −19.251 | 15.000 |  |  |  |

Aspherical surfaces

First face $K=-2.049$, $A=0.0$, $B=-7.25$ $E-5$, $C=-9.19$ $E-7$ $D=7.03$ $E-10$ Fourth face $K=-0.180$, $A=0.0$, $B=-7.21$ $E-5$, $C=4.01$ $E-6$ $D=1.91$ $E-6$ Fifth face $K=-0.918$, $A=0.0$, $B=-6.29$ $E-5$, $C=9.17$ $E-5$ $D=8.11$ $E-7$ Tenth face $K=2.328$, $A=0.0$, $B=6.13$ $E-4$, $C=7.96$ $E-6$ $D=0.0$ Thirteenth face $K=-29.343$, $A=0.0$, $B=2.45$ $E-4$, $C=-3.88$ $E-6$ $D=0.0$ Variable amounts State of shortest focal length (wide angle state) $D_2=0.263$, $D_6=8.287$, $D_8=3.580$, $D_{14}=1.8$ State of intermediate focal length (mean state) $D_2=4.108$, $D_6=4.442$, $D_8=3.0$, $D_{14}=2.58$ State of longest focal length (telescopic state) $D_2=8.287$, $D_6=0.263$, $D_8=3.580$, $D_{14}=1.8$ The diopter of a visual field is corrected and set to $-1$ dpt by moving the eyepiece. The visual field frame arranged on the eyepiece side of the image inverting prism 5 is moved as the zooming operation is performed from the wide angle state to the telescopic state. The visual field frame approaches the image inverting prism 5 to such an extent that the visual field frame comes in contact with the image inverting prism 5 in the wide angle and telescopic states. The visual field frame is moved by 0.57 mm onto the eyepiece side in the mean state. A diopter of the visual field frame is in conformity with the diopter of the visual field by this movement of the visual field frame.

FIGS. 22a, 22b and 22c respectively show spherical aberration, astigmatism and distortional aberration in the above wide angle state of the real image type zoom finder. FIGS. 23a, 23b and 23c respectively show spherical aberration, astigmatism and distortional aberration in the above mean state of the real image type zoom finder. FIGS. 24a, 24b and 24c respectively show spherical aberration, astigmatism and distortional aberration in the above telescopic state of the real image type zoom finder.

Embodiment 9

The Embodiment 9 is an embodiment of the real image type zoom finder having each of the eleventh, twelfth and fourteenth lens structures. In this Embodiment 9, the converter lens in the Embodiment 4 is inserted between the second and third lens groups of the objective lens in the Embodiment 8 so that an S-wide angle state is realized. Lens face distances $D_2$, $D_6$, $D_8$ and $D_{10}$ in the S-wide angle state are provided as follows in accordance with Embodiment 9.

|  | S-WIDE |
|---|---|
| $D_2$ | 0.263 |
| $D_6$ | 8.287 |
| $D_8$ | 3.58 |
| $D_{10}$ | 0.22 |

FIGS. 25a, 25b and 25c respectively show spherical aberration, astigmatism and distortional aberration in the above S-wide angle state of the real image type zoom finder.

Embodiment 10

The Embodiment 10 is an embodiment of the real image type zoom finder having each of the twelfth, thirteenth and fifteenth lens structures. In this Embodiment 10, the converter lens in the Embodiment 5 is inserted between the first and second lens groups of the objective lens in the Embodiment 8 so that an S-telescopic state is realized. Lens face distances $D_2$, $D_8$, $D_8$ and $D_{10}$ in the S-telescopic state are provided as follows in accordance with Embodiment 10.

|  | S-TELE |
|---|---|
| $D_2$ | 8.287 |
| $D_6$ | 0.263 |
| $D_8$ | 3.58 |
| $D_{10}$ | 1.44 |

FIGS. 26a, 26b and 26c respectively show spherical aberration, astigmatism and distortional aberration in the above S-telescopic state of the real image type zoom finder.

Embodiment 11

The Embodiment 11 is an embodiment of the real image type zoom finder having each of the sixteenth and eighteenth lens structures. In this Embodiment 11, the diopter of a visual field is adjusted and set to 0 dpt by moving the eyepiece in each of the above Embodiment 8, 9 and 10. The diopter of the; visual field is adjusted and set to 0 dpt in all of the wide angle, mean, telescopic, S-wide angle and S-telescopic states. Therefore, the eyepiece is moved by 0.68 mm in a direction opposite to the object side.

Lens face distances $D_2$, $D_6$, $D_8$ and $D_{10}$ in the wide angle, mean and telescopic states are provided as follows in accordance with Embodiment 11.

|  | WIDE | MEAN | TELE |
|---|---|---|---|
| $D_2$ | 0.263 | 4.108 | 8.287 |
| $D_6$ | 8.287 | 4.442 | 0.263 |
| $D_8$ | 3.580 | 3.0 | 3.580 |
| $D_{14}$ | 2.48 | 3.26 | 2.48 |

Lens face distances $D_2$, $D_6$, $D_8$ and $D_{10}$ in the S-wide angle state in the Embodiment 9 are provided as follows when the converter lens in the above Embodiment 4 is used. Further, lens face distances $D_2$, $D_6$, $D_8$ and $D_{10}$ in the S-telescopic state in the Embodiment 10 are provided as follows when the converter lens in the above Embodiment 5 is used.

|  | S-WIDE | S-TELE |
|---|---|---|
| $D_2$ | 0.263 | 8.287 |
| $D_6$ | 8.287 | 0.263 |
| $D_8$ | 3.58 | 3.58 |
| $D_{10}$ | 0.9 | 2.12 |

FIGS. 27a, 27b and 27c respectively show spherical aberration, astigmatism and distortional aberration in the above wide angle state of the real image type zoom finder. FIGS. 28a, 28b and 28c respectively show spherical aberration, astigmatism and distortional aberration in the above mean state of the real image type zoom finder. FIGS. 29a, 29b and 29c respectively show spherical aberration, astigmatism and distortional aberration in the above telescopic state of the real image type zoom finder. FIGS. 30a, 30b and 30c respectively show spherical aberration, astigmatism and distortional aberration in the above S-wide angle state of the real image type zoom finder. FIGS. 31a, 31b and 31c respectively show spherical aberration, astigmatism and distortional aberration in the above S-telescopic state of the real image type zoom finder.

Embodiment 12

Figure 32:
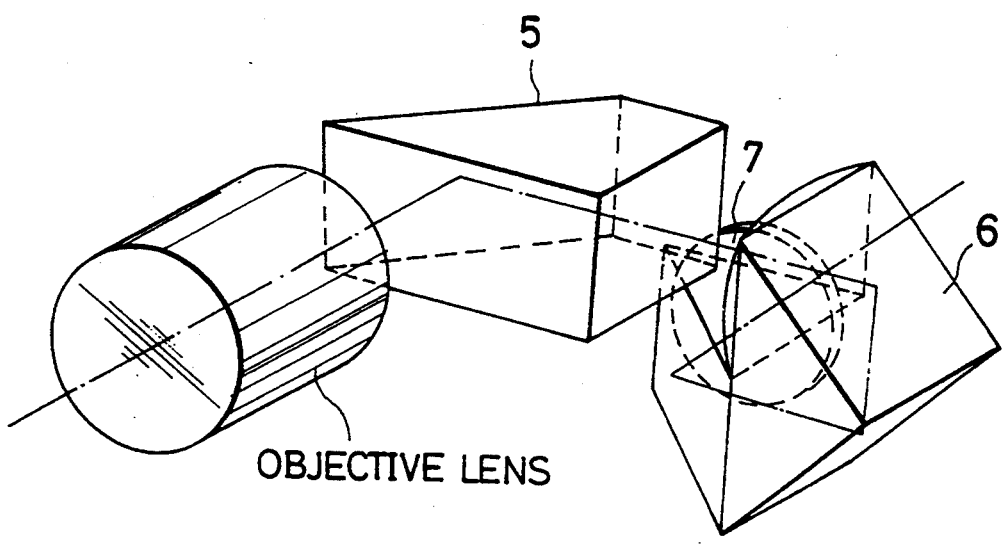

In the Embodiment 12, the angle of a visual field corresponding to the direction of a short side of a photographing screen is set to 29.3 degrees. The angle of a visual field corresponding to the direction of a long side of the photographing screen is set to 42.9 degrees. The diameter $\phi$ of an exit pupil is set to 3 mm in the position of an eye point. As shown in FIG. 32, an image inverting system used on the eyepiece side of an objective lens is constructed by prisms 5 and 6 formed by a material having a refractive index 1.5258. A maximum angle formed between an optical axis of the objective lens and a light beam within these prisms 5 and 6 is set to 3.98 degrees on the short and long sides of the photographing screen. $|45$ degrees$-\sin^{-1}(1/1.5258)|$ is approximately equal to 4.05 degrees in a condition for totally reflecting the light beam on a reflecting face of each of the prisms. Accordingly, all of the light beam transmitted through the eye pupil within the visual field frame are totally reflected on the reflecting face.

| i | $R_i$ | $D_i$ | j | $N_j$ | $v_j$ |
|---|---|---|---|---|---|
| 1 | 20.063 | 2.690 | 1 | 1.49154 | 57.82 |
| 2 | −27.373 | variable | | | |
| 3 | 14.004 | 1.040 | 2 | 1.49154 | 57.82 |
| 4 | 4.418 | 2.820 | | | |
| 5 | −4.938 | 1.030 | 3 | 1.49154 | 57.82 |
| 6 | −9.726 | variable | | | |
| 7 | 10.101 | 2.130 | 4 | 1.58500 | 29.30 |
| 8 | −29.529 | variable | | | |
| 9 | 17.798 | 2.520 | 5 | 1.49154 | 57.82 |
| 10 | −13.587 | variable | | | |
| 11 | ∞ | 15.130 | 6 | 1.52580 | 52.10 |
| 12 | ∞ | 5.13 | | | |
| 13 | 17.069 | 27.5 | 7 | 1.52580 | 52.10 |
| 14 | ∞ | 0.3 | | | |
| 15 | 36.904 | 2.200 | 8 | 1.49454 | 57.82 |
| 16 | −19.251 | 15.000 | | | |

Aspherical surfaces

First face K=−2.049, A=0.0, B=−7.25 E−5, C=−9.19 E−7 D=7.03 E−10

Fourth face K=−0.180, A=0.21 E−5, C=4.01 E−6 D=1.91 E−6

Fifth face K=−0.518, A=0.0, B=−6.29 E−5, C=9.17 E−5 D=8.11 E−7

Tenth face K=2.328, A=0.0, B=6.13 E−4, C=7.96 E−6 D=0.0

Thirteenth face K=−38.343, A=0.0, B=2.45 E−4, C=−3.88 E−6 D=0.0

Variable amounts

State of shortest focal length (wide angle state) $D_2=0.263$, $D_6=8.287$, $D_8=3.580$, $D=0.67$ State of intermediate focal length (mean state) $D_2=4.108$, $D_6=4.442$, $D_8=3.0$, $D_{10}=1.25$ State of longest focal length (telescopic state) $D_2=8.287$, $D_6=0.283$, $D_8=3.580$, $D_{10}=0.67$ As mentioned above, the present invention can provide a novel zoom finder of a real image type and a real image type zoom finder capable of making a magnification transition. A first lens group of an objective lens and an eyepiece are not moved in each of the real image type zoom finder having a first lens structure and the real image type zoom finder capable of making a magnification transition and having each of second to sixth lens structures. Accordingly, no entire length of the zoom finder is changed when a zooming operation is performed and magnifications are changed or transited. Two lens groups moved for the zooming operation and the correction of a diopter are arranged in a normal zooming region so that the structure of a zooming mechanism is simplified. Further, a change in diopter caused by the zooming operation can be corrected by a fourth lens group of the objective lens. Accordingly, no change in diopter is caused by the zooming operation so that it is easy for an operator to see a visual field.

In the real image type zoom finder capable of making a magnification transition and having each of the second and fourth lens structures, a converter lens is inserted between lens groups in a state in which the lens groups are arranged in a lowest magnification state of the zoom finder having the first lens structure at the time of a low magnification transition. Accordingly, the entire length of the zoom finder is constant and the structure of a zooming mechanism is simplified. The converter lens is constructed by negative and positive lenses so that a change in diopter between before and after the insertion of the converter lens can be reduced and set to zero.

In the real image type zoom finder capable of making a magnification transition and having each of the third and fourth lens structures, a converter lens is inserted between lens groups in a state in which the lens groups are arranged in a highest magnification state of the zoom finder having the first lens structure at the time of a high magnification transition. Accordingly, the entire length of the zoom finder is constant and the structure of a zooming mechanism is simplified. The converter lens is constructed by positive and negative lenses so that a change in diopter between before and after the insertion of the converter lens can be reduced and set to zero.

In the real image type zoom finder capable of making a magnification transition and having each of the fifth and sixth lens structures, the diopter of the zoom finder is constant before and after the insertion of a converter lens. Accordingly, image forming performance of the zoom finder is preferably improved after the magnification transition in comparison with the zoom finder having each of the second to fourth lens structures.

In a real image type zoom finder having a seventh lens structure, the diopter of the zoom finder can be adjusted and set to a diopter for easily making an observer look into the finder by using a movement of the fourth lens group as a moving lens group at a zooming time. In a real image type zoom finder having an eighth lens structure, a shift in position between a visual field frame and a focal point of the objective lens is effectively corrected.

In a real image type zoom finder having each of ninth to eighteenth lens structures, a lens group moved by the zooming operation is constructed by a second lens group of the objective lens and an eyepiece. Accordingly, it is not necessary to secure a space for moving lenses and the structure of a mechanism for moving the lenses is simplified. In the real image type zoom finder having the tenth lens structure, the diopter of a visual field is set to be in conformity with a diopter of the visual field frame. In the real image type zoom finder having each of the eleventh to thirteenth lens structures, a converter lens is added to make a magnification transition. In the real image type zoom finder having each of the fourteenth and fifteenth lens structures, the diopter of the zoom finder is corrected by displacing the eyepiece. Accordingly, it is possible to preferably correct aberrations in comparison with a case in which the diopter of the zoom finder is corrected by only a converter lens.

In the real image type zoom finder having each of the sixteenth and seventeenth lens structures, a shift in diopter of the visual field frame is corrected. In the real image type zoom finder having the eighteenth lens structure, it is possible to realize a diopter for easily making an observer look into the finder. In a real image type zoom finder having a nineteenth lens structure, an image inverting system is disposed on an eyepiece side of the objective lens and functions as a condenser lens. Accordingly, the number of optical elements in an optical system of the zoom finder is reduced so that cost of the zoom finder can be reduced. In a real image type zoom finder having a twentieth lens structure, light can be totally reflected on a reflecting face of the above image inverting system. Accordingly, light transmitting efficiency of the image inverting system is improved and a bright finder image can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A zoom finder of a real image type comprising:
    an objective lens having positive refracting power; and
    an eyepiece having positive refracting power;
    said objective lens being constructed by first, second, third and fourth lens groups sequentially arranged from an object side;
    the first lens group having positive refracting power;
    the second lens group having negative refracting power;
    the third lens group having positive refracting power; and
    the fourth lens group having positive refracting power;
    the zoom finder being constructed such that a real image is focused and formed by said objective lens between said fourth lens group and said eyepiece and is observed through the eyepiece; and
    a magnification of the zoom finder is increased by moving said second lens group from the object side to an eyepiece side, and a change in diopter caused by this increase in magnification is corrected by moving the fourth lens group.

2. A zoom finder of a real image type capable of making a magnification transition, comprising:
    an objective lens having positive refracting power; and
    an eyepiece having positive refracting power;
    said objective lens being constructed by first, second, third and fourth lens groups sequentially arranged from an object side;
    the first lens group having positive refracting power;
    the second lens group having negative refracting power;
    the third lens group having positive refractive power; and
    the fourth lens group having positive refracting power;
    the zoom finder being constructed such that a real image is focused and formed by said objective lens between said fourth lens group and said eyepiece and is observed through the eyepiece; and
    a magnification of the zoom finder is increased by moving said second lens group from the object side to an eyepiece side, and a change in diopter caused by this increase in magnification is corrected by moving the fourth lens group,
    wherein the zoom finder further comprises a converter lens for a low magnification transition constructed by negative and positive lenses and detachably attached to said real image type zoom finder; and
    said converter lens for a low magnification transition in inserted between the second and third lens groups in a lowest magnification state of said real image type zoom finder so as to locate said negative lens of this converter lens on the object side such that the magnification of the zoom finder is changed to a magnification lower than said lowest magnification.

3. A zoom finder of a real image type capable of making a magnification transition, comprising:
    an objective lens having positive refracting power; and
    an eyepiece having positive refracting power;
    said objective lens being constructed by first, second, third and fourth lens groups sequentially arranged from an object side;
    the first lens group having positive refracting power;
    the second lens group having negative refracting power;
    the third lens group having positive refractive power; and
    the fourth lens group having positive refracting power;
    the zoom finder being constructed such that a real image is focused and formed by said objective lens between said fourth lens group and said eyepiece and is observed through the eyepiece; and
    a magnification of the zoom finder is increased by moving said second lens group from the object side to an eyepiece side, and a change in diopter caused by this increase in magnification is corrected by moving the fourth lens group,
    wherein the zoom finder further comprises a converter lens for a high magnification transition constructed by positive and negative lenses and detachably attached to said real image type zoom finder; and
    said converter lens for a high magnification transition is inserted between the first and second lens groups in a highest magnification state of said real image type zoom finder so as to locate said positive lens of this converter lens on the object side such that the magnification of the zoom finder is changed to a magnification higher than said highest magnification.

4. A zoom finder of a real image type capable of making a magnification transition, comprising:

an objective lens having positive refracting power; and an eyepiece having positive refracting power;

said objective lens being constructed by first, second, third and fourth lens groups sequentially arranged from an object side.;

the first lens group having positive refracting power;

the second lens group having negative refracting power;

the third lens group having positive refractive power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving the fourth lens group, wherein the zoom finder further comprises a converter lens for a low magnification transition constructed by negative and positive lenses and detachably attached to said real image type zoom finder; and a converter lens for a high magnification transition constructed by positive and negative lenses;

the converter lens for a high magnification transition and the converter lens for a low magnification transition are selected and can be detachably attached to said real image type zoom finder;

said converter lens for a low magnification transition is inserted between the second and third lens groups in a lowest magnification state of said real image type zoom finder so as to locate said negative lens of this converter lens on the object side such that the magnification of the zoom finder is changed to a magnification lower than said lowest magnification; and said converter lens for a high magnification transition is inserted between the first and second lens groups in a highest magnification state of said real image type zoom finder so as to locate said positive lens of this converter lens on the object side such that the magnification of the zoom finder is changed to a magnification higher than said highest magnification.

5. A zoom finder of a real image type capable of making a magnification transition as claimed in claim 2, wherein a diopter of the zoom finder is constantly held by moving the fourth lens group of the objective lens in an optical axis direction of the zoom finder when the converter lens for a low magnification transition is inserted into the zoom finder.

6. A zoom finder of a real image type capable of making a magnification transition as claimed in claim 3, wherein a diopter of the zoom finder is constantly held by moving the fourth lens group of the objective lens in an optical axis direction of the zoom finder when the converter lens for a high magnification transition is inserted into the zoom finder.

7. A zoom finder of a real image type as claimed in claim any, one of claims 1 to 6, wherein a diopter at a visual field can be adjusted and set by moving the fourth lens group to produce an arbitrary diopter in an entire zooming region.

8. A zoom finder of a real image type as claimed in claim 7, wherein a visual field frame can be moved such that a diopter at the visual field frame is substantially equal to the diopter at the visual field.

9. A zoom finder of a real image type comprising:

an objective lens having positive refracting power; and an eyepiece having positive refracting power;

said objective lens being constructed by first, second, third and fourth lens groups sequentially arranged from an object side;

the first lens group having positive refracting power;

the second lens group having negative refracting power;

the third lens group having positive refracting power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving said eyepiece.

10. A zoom finder of a real image type, comprising:

an objective lens having positive refracting power; and an eyepiece having positive refracting power;

said objective lens being constructed by first, second, third and fourth lens groups sequentially arranged from an object side;

the first lens group having positive refracting power;

the second lens group having negative refracting Dower;

the third lens group having positive refractive power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving said eyepiece, wherein a visual field frame can be moved to correct a change in diopter at the visual field frame caused by moving the eyepiece.

11. A zoom finder of a real image type capable of making a magnification transition, comprising:

an objective lens having positive refracting power; and an eyepiece having positive refracting power;

said objective lens being constructed by first, second, third and fourth lens groups sequentially arranged from an object side;

the first lens group having positive refracting power;

the second lens group having negative refracting power;

the third lens group having positive refractive power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving said eyepiece, wherein the zoom finder further comprises a converter lens for a low magnification transition constructed by negative and positive lenses and detachably attached to said real image type zoom finder; and said converter lens for a low magnification transition is inserted between the second and third lens groups in a lowest magnification state of said real image type zoom finder so as to locate said negative lens of this converter lens on the object side such that the magnification of the zoom finder is changed to a magnification lower than said lowest magnification.

12. A zoom finder of a real image type capable of making a magnification transition, comprising:

an objective lens having positive refracting power; and an eyepiece having positive refracting Dower;

said objective lens being constructed by first, second, third and fourth lens groups sequentially arranged from an object side;

the first lens group having positive refracting power;

the second lens group having negative refracting power;

the third lens group having positive refractive power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving the fourth lens group, wherein the zoom finder further comprises a converter lens for a high magnification transition constructed by positive and negative lenses and detachably attached to said real image type zoom finder; and said converter lens for a high magnification transition is inserted between the first and second lens groups in a highest magnification state of said real image type zoom finder so as to locate said positive lens of this converter lens on the object side such that the magnification of the zoom finder is changed to a magnification higher than said highest magnification.

13. A zoom finder of a real image type capable of making a magnification transition, comprising:

an objective lens having positive refracting power; and an eyepiece having positive refracting power;

said objective lens being constructed by first, second, third and fourth lens groups sequentially arranged from an object side;

the first lens group having positive refracting power;

the second lens group having negative refracting power;

the third lens group having positive refractive power; and the fourth lens group having positive refracting power;

the zoom finder being constructed such that a real image is focused and formed by said objective lens between said fourth lens group and said eyepiece and is observed through the eyepiece; and a magnification of the zoom finder is increased by moving said second lens group from the object side to an eyepiece side, and a change in diopter caused by this increase in magnification is corrected by moving said eyepiece, wherein the zoom finder further comprises a converter lens for a low magnification transition constructed by negative and positive lenses and detachably attached to said real image type zoom finder; and a converter lens for a high magnification transition constructed by positive and negative lenses;

the converter lens for a high magnification transition and the converter lens for a low magnification transition are selected and can be detachably attached to said real image type zoom finder:

said converter lens for a low magnification transition is inserted between the second and third lens groups in a lowest magnification state of said real image type zoom finder so as to locate said negative lens of this converter lens on the object side such that the magnification of the zoom finder is changed to a magnification lower than said lowest magnification; and said converter lens for a high magnification transition is inserted between the first and second lens groups in a highest magnification state of said real image type zoom finder so as to locate said positive lens of this converter lens on the object side such that the magnification of the zoom finder in changed to a magnification higher than said highest magnification.

14. A zoom finder of a real image type capable of making a magnification transition as claimed in claim 11, wherein a diopter of the zoom finder is constantly held by moving the eyepiece in an optical axis direction of the zoom finder when the converter lens for a low magnification transition is inserted into the zoom finder.

15. A zoom finder of a real image type capable of making a magnification transition as claimed in claim 12, wherein a diopter of the zoom finder is constantly held by moving the eyepiece in an optical axis direction of the zoom finder when the converter lens for a high magnification transition is inserted into the zoom finder.

16. A zoom finder of a real image type capable of making a magnification transition as claimed in claim 14, wherein a visual field frame can be moved in the optical axis direction at an inserting time of the converter lens for a low magnification transition such that diopters of a visual field and the visual field frame are constantly held.

17. A zoom finder of a real image type capable of making a magnification transition as claimed in claim 15, wherein a visual field frame can be moved in the optical axis direction at an inserting time of the converter lens for a high magnification transition such that diopters of a visual field and the visual field frame are constantly held.

18. A zoom finder of a real image type as claimed in any one of claims 9 to 17, wherein the diopter at a visual field can be adjusted and set by moving the eyepiece to produce an arbitrary diopter in an entire zooming region.

19. A zoom finder of a real image type as claimed in claim 18, wherein an image inverting system is disposed on an eye pupil side of the objective lens, and a portion or all of this image inverting system are constructed by a prism, and a prism portion near an image face of the objective lens is set to have an aspherical surface.

20. A zoom finder of a real image type as claimed in claim 19, wherein the prism of the image inverting system has a refractive index equal to or greater than 1.5.

21. A zoom finder of a real image type comprising:
an objective lens having positive refracting power; and
an eyepiece having positive refracting power;
said objective lens group including a first lens having positive refracting power, a pair of second lenses having negative refracting power, a third lens having positive refracting power, and a fourth lens having positive refracting power, sequentially arranged from an object side;
said zoom finder being adapted in such a manner that a real image is focused and formed by said objective lens group between said fourth lens and said eyepiece and is observed through said eyepiece, and
a magnification of the zoom finder is increased by moving said pair of second lens group from the said object side to an eyepiece side, and a change in diopter caused by this increase in magnification is corrected by moving said fourth lens.

22. A zoom finder of a real image type according to claim 21, wherein two surfaces of said pair of second lenses, which face each other, are formed in aspherical.

23. A zoom finder of a real image type comprising:
an objective lens group having positive refracting power; and
an eyepiece having positive refracting power,
said objective lens group including a first lens having positive refracting power, a pair of second lenses having negative refracting power, a third lens having positive refracting power, and a fourth lens having positive refracting power, sequentially arranged from an object side,
said zoom finder being adapted in such a manner that a real image is focused and formed by said objective lens group between said fourth lens and said eyepiece and is observed through said eyepiece, and
a magnification of said zoom finder is increased by moving said pair of second lenses from said object side to an eyepiece side, and a change in diopter caused by this increase in magnification is corrected by moving said eyepiece.

24. A zoom finder of a real image type according to claim 23, wherein two surfaces of said pair of second lenses, which face to each other, are formed in aspherical.

* * * * *